United States Patent
Yamamoto

(10) Patent No.: US 7,417,756 B2
(45) Date of Patent: Aug. 26, 2008

(54) IMAGE PROCESSING DEVICE, IMAGE PROCESSING METHOD, IMAGE PROCESSING PROGRAM, AND COMPUTER READABLE RECORDING MEDIUM ON WHICH THE PROGRAM IS RECORDED

(75) Inventor: Kazuto Yamamoto, Yokohama (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 1146 days.

(21) Appl. No.: 10/614,048

(22) Filed: Jul. 8, 2003

(65) Prior Publication Data
US 2004/0008373 A1  Jan. 15, 2004

(30) Foreign Application Priority Data
Jul. 8, 2002  (JP) ............................. 2002-199187

(51) Int. Cl.
G06F 3/12 (2006.01)
H04N 1/00 (2006.01)
(52) U.S. Cl. ...................................... 358/1.15; 358/402
(58) Field of Classification Search ................ 358/1.15, 358/402, 1.13, 1.1, 1.6, 1.16, 1.18, 407, 468, 358/403, 1.14; 347/2, 3, 5; 399/1, 8; 707/10; 709/239; 379/93.24
See application file for complete search history.

(56) References Cited

U.S. PATENT DOCUMENTS 6,628,306 B1 * 9/2003 Marchionda ................ 715/752
2001/0013056 A1   8/2001 Mori et al.
2002/0016818 A1 * 2/2002 Kirani et al. ................ 709/203
2002/0140986 A1   10/2002 Takayama
2005/0188026 A1 * 8/2005 Hilbert et al. ............... 709/206

FOREIGN PATENT DOCUMENTS

JP    2000235529 A   *   8/2000

OTHER PUBLICATIONS

Notification of Reason for Refusal dated Apr. 24, 2007 in Japanese Patent No. 2002-1999 (with English Translation).

* cited by examiner

Primary Examiner—Dov Popovici
(74) Attorney, Agent, or Firm—Buchanan Ingersoll & Rooney PC

(57) ABSTRACT

Upon receiving a first e-mail, which is deprived of its attachment file due to a capacity limitation of mail server 21*a*, MFP 11*a* transmits a second e-mail containing its own IP address and a transfer request for transferring the attachment file to MFP 14*a*, which is the transmission source of the first e-mail, and other transmission destinations, MFP 12*a* and 13*a*. Of those MFPs which received the second e-mail, MFP 12*a* is accessible to MFP 11*a* via network 30 and transmits the attachment file to MFP 11*a*, and MFP 11*a* prints out the attachment file upon receiving it, according to an example configuration. The invention makes it possible to acquire and print out a file attached to an e-mail when it cannot be received directly due to the capacity limit of the mail server by obtaining it from the transmission source or from another transmission destination.

32 Claims, 20 Drawing Sheets

| To: | mfp11a@mail21a.net30.com |
| --- | --- |
| Cc: | mfp12a@mail22a.net30.com; mfp13a@mail23a.net33.com |
| From: | mfp14a@mail24a.net34.com |
| Subject: | E-mail_print |
| Attachmemt: | scan#001.jpg |
| Body: | PRINTING SETUP:<br>Size A4<br>Duplex Top-Top<br>Staple corner |

| To: | mfp11a@mail21a.net30.com |
| --- | --- |
| Cc: | mfp12a@mail22a.net30.com; mfp13a@mail23a.net33.com |
| From: | mfp14a@mail24a.net34.com |
| Subject: | E-mail_print |
| Body: | PRINTING SETUP:<br>Size A4<br>Duplex Top-Top<br>Staple corner<br><br>ATTACHMENT FILE "SCAN#001.JPG" IS REMOVED DUE TO CAPACITY LIMIT. |

| To: | mfp14a@mail24a.net34.com; mfp12a@mail22a.net30.com; mfp13a@mail23a.net33.com |
|---|---|
| From: | mfp11a@mail21a.net30.com |
| Subject: | Re:E-mail_print |
| Body: | PLEASE TRANSMIT ATTACHMENT FILE "SCAN#001.JPG" OF THIS MAIL TO "111.222.333.444."<br><br>From:mfp14a@mail24a.net34.com<br>Sent:Friday,June 14,2002 9:00AM<br>To:mfp11a@mail21a.net30.com<br>Cc:mfp12a@mail22a.net30.com;mfp13a@mail23a.net33.com<br>Subject:E-mail_print<br>Attachment:scan#001.jpg |

| To: | mfp14b@mail24a.net34.com; mfp12b@mail22a.net30.com; mfp13b@mail23a.net33.com |
|---|---|
| From: | mfp11b@mail21a.net30.com |
| Subject: | Re:E-mail_print |
| Body: | PLEASE PROVIDE IP ADDRESS IN RETURN AS "SCAN#001.JPG" ATTACHED TO THIS MAIL NEEDS TO BE DOWNLOADED<br><br>From:mfp14b@mail24a.net34.com<br>Sent:Friday,June 14,2002 9:00AM<br>To:mfp11b@mail21a.net30.com<br>Cc:mfp12b@mail22a.net30.com;mfp13b@mail23a.net33.com<br>Subject:E-mail_print<br>Attachment:scan#001.jpg |

| To: | mfp11b@mail21a.net30.com |
| From: | mfp12b@mail22a.net30.com |
| Subject: | Re:Re:E-mail_print |
| Body: | PLEASE CONNECT WITH "111.222. 333.555."<br><br>From:mfp14b@mail24a.net34.com<br>Sent:Friday,June 14,2002 9:00AM<br>To:mfp11b@mail21a.net30.com<br>Cc:mfp12b@mail22a.net30.com;mfp13b@mail23a.net33.com<br>Subject:E-mail_print<br>Attachment:scan#001.jpg |

IMAGE PROCESSING DEVICE, IMAGE PROCESSING METHOD, IMAGE PROCESSING PROGRAM, AND COMPUTER READABLE RECORDING MEDIUM ON WHICH THE PROGRAM IS RECORDED

This application is based on Japanese Patent Application No. 2002-199187 filed on Jul. 8, 2002, the contents of which are hereby incorporated by reference.

BACKGROUND OF THE INVENTION

1. Field of the Invention

The present invention relates to an image processing device. More specifically, it is an image processing device being capable of printing a file attached to an electronic message when it cannot be received due to the capacity limit of the mail server by acquiring it from the transmission source or from another transmission destination.

2. Description of Related Art

The use of various multi-function peripheral ("MFP") devices having multiple functions such as scanning, printing and copying has become popular in recent years. Some of these MFP devices are capable of not only transmitting image data captured by scanning original document images and attaching the image data to electronic mail ("e-mail") messages, but also capable of developing received image data files attached to e-mail messages into bitmap data and printing said data, so that e-mail printing systems for transmitting such printing data attached to e-mail messages to such MFP devices to be printed have come to be used.

In some cases, however, such an e-mail printing system can create a situation where an MFP at the delivery destination cannot print the attachment file as it is prevented from being transmitted due to the capacity limitation of the relaying mail server. In order to solve the problem, there have been several proposals: a method of breaking down an e-mail message into a plurality of e-mail messages at the transmission source device, if the volume of said message exceeds said capacity limitation and restoring the original message from the divided messages at the transmission destination device (US 2001/0013056 A1); and a method of storing an attachment file at a specified location of the transmission source device, if it cannot be transmitted due to a size limitation, and later accessing and downloading it from the stored location at the transmission destination device (US 2002/0140986 A1). However, there is a problem with the first method in that the process becomes too complicated as it is necessary for the transmission source device to divide the file in advance into smaller divisions according to a preset upper limit, which suits the smallest capacity limit among the mail servers the message has to deal with in its transmission. Also, there is a problem with the latter method in that it may be impossible for the transmission destination device to access the transmission source device due to the network environment of the transmission source device (firewall, etc.) if the transmission destination device cannot receive an e-mail message due to its size and hence it has to access the transmission source device.

SUMMARY OF THE INVENTION

Since the volumetric upper limit varies with the mail server of each transmission destination as mentioned above, there is a possibility that, even if an MFP device at a transmission destination fails to receive a file attached to an e-mail message due to the capacity limit of a mail server, MFP devices at other transmission destinations may still be able to receive the same attachment file, so that it is more convenient for the MFP device that failed to receive it to acquire it from one of the MFP devices which can be accessed.

The present invention is intended to solve the problems of the prior art mentioned above by providing an image processing device that is capable of printing attachment files of e-mail that cannot be received due to the mail server's capacity limit by acquiring them either from the transmission source or from another transmission destination.

Said objective of the present invention can be accomplished by the following means:

(1) An image processing device comprising: an e-mail receiving means for receiving first e-mail transmitted with an attachment file but deprived of said attachment file due to a capacity limit of a relaying mail server; an e-mail transmitting means for transmitting second e-mail, which contains information of its own online location and a transfer request for transferring said attachment file, to the transmission source and other transmission destinations of said first e-mail in response to receiving of said first e-mail; an attachment file receiving means for receiving said attachment file transmitted in response to said second e-mail from equipment pertaining to the transmission source or another transmission destination of said first e-mail; and an image forming means for forming images of said attachment file in response to receiving of said attachment file.

(2) An image processing device comprising: a first e-mail receiving means for receiving first e-mail having an attachment file; an image forming means for forming images for said attachment file; a second e-mail receiving means for receiving second e-mail, which contains online location information of equipment pertaining to another transmission destination of said first e-mail and a transfer request for transferring said attachment file, from said another transmission destination; and an attachment file transferring means for transferring said attachment file to equipment pertaining to said another transmission destination in response to receiving of said second e-mail, when it is possible to access said equipment pertaining to said another transmission destination based on the online location information of said equipment pertaining to said another transmission destination.

(3) An image processing device comprising: an e-mail transmitting means for transmitting first e-mail having an attachment file; an e-mail receiving means for receiving second e-mail containing online location information of equipment pertaining to transmission destination of said first e-mail and a transfer request for transferring said attachment file, from said transmission destination; and an attachment file transferring means for transferring said attachment file to said equipment pertaining to said transmission destination in response to receiving of said second e-mail, when it is possible to access said equipment pertaining to said transmission destination based on online location information of said equipment pertaining to said transmission destination.

(4) An image processing device comprising: a first e-mail receiving means for receiving first e-mail transmitted with an attachment file but deprived of said attachment file due to a capacity limit of a relaying mail server; an e-mail transmitting means for transmitting second e-mail containing a response request for responding online location information of equipment pertaining to the transmission source or other transmission destinations to said transmission source and said other transmission destinations in response to receiving of said first e-mail; a second e-mail receiving means for receiving third e-mail, which contains online location information of equipment pertaining to said transmission source or another transmission destination of said first e-mail, transmitted from said transmission source or said another transmission destination in accordance with said second e-mail; a transfer request transmitting means for transmitting a transfer request for transferring said attachment file to equipment pertaining to said transmission source or said another transmission destination in response to receiving of said third e-mail, when it is possible to access to said equipment pertaining to said transmission source or said another transmission destination based on online location information of equipment pertaining to said transmission source or said another transmission destination; an attachment file receiving means for receiving said attachment file transmitted from said transmission source or said another transmission destination in response to said transfer request; and an image forming means for forming images of said attachment file in response to the receiving by said attachment file receiving means.

(5) An image processing device comprising: a first e-mail receiving means for receiving e-mail having an attachment file; an image forming means for forming images for said attachment file; a second e-mail receiving means for receiving second e-mail containing a response request for responding its own online location information from another transmission destination of said first e-mail; an e-mail transmission means for transmitting third e-mail containing its own online location information to said another transmission destination in response to receiving of said second e-mail; a transfer request receiving means for receiving a transfer request for transferring said attachment file transmitted in response to said third e-mail by equipment pertaining to said another transmission destination; and an attachment file transfer means for transmitting said attachment file to equipment pertaining to said another transmission destination in response to said transfer request.

(6) An image processing device comprising: a first e-mail transmitting means for transmitting a first e-mail having an attached file; an e-mail receiving means for receiving second e-mail containing a response request for responding its own online location information from the transmission destination of said first e-mail; a second e-mail transmission means for transmitting third e-mail containing its own online location information to said transmission destination in response to receiving of said second e-mail; a transfer request receiving means for receiving a transfer request for transferring said attachment file transmitted from equipment pertaining to said transmission destination in response to said third e-mail; and an attachment file transfer means for transmitting said attachment file to equipment pertaining to said transmission destination in response to said transfer request.

(7) A mail server comprising: an e-mail receiving means for receiving e-mail having an attachment file; and an e-mail delivery means for delivering said e-mail deprived of said attachment file to the transmission destination of said e-mail when volume of said e-mail exceeds a specified capacity limit.

(8) An image processing device comprising: an e-mail receiving part for receiving first e-mail transmitted with an attachment file but deprived of said attachment file due to a capacity limit of a relaying mail server; an e-mail transmitting part for transmitting second e-mail, which contains information of its own online location and a transfer request for transferring said attachment file, to the transmission source and other transmission destinations of said first e-mail in response to receiving of said first e-mail; an attachment file receiving part for receiving said attachment file transmitted in response to said second e-mail from equipment pertaining to the transmission source or another transmission destination of said first e-mail; and an image forming part for forming images of said attachment file in response to the receiving by said attachment file receiving part.

(9) An image processing device comprising: a first e-mail receiving part for receiving first e-mail having an attachment file; an image forming part for forming images for said attachment file; a second e-mail receiving part for receiving second e-mail, which contains online location information of equipment pertaining to another transmission destination of said first e-mail and a transfer request for transferring said attachment file, from said another transmission destination; and an attachment file transferring part for transferring said attachment file to equipment pertaining to said another transmission destination in response to receiving of said second e-mail, when it is possible to access said equipment pertaining to said another transmission destination based on the online location information of said equipment pertaining to said another transmission destination.

(10) An image processing device comprising: an e-mail transmitting part for transmitting first e-mail having an attachment file; an e-mail receiving part for receiving second e-mail containing online location information of equipment pertaining to transmission destination of said first e-mail and a transfer request for transferring said attachment file, from said transmission destination; and an attachment file transferring part for transferring said attachment file to said equipment pertaining to said transmission destination in response to receiving of said second e-mail, when it is possible to access said equipment pertaining to said transmission destination based on online location information of said equipment pertaining to said transmission destination.

(11) An image processing device comprising: a first e-mail receiving part for receiving first e-mail transmitted with an attachment file but deprived of said attachment file due to a capacity limit of a relaying mail server; an e-mail transmitting part for transmitting second e-mail containing a response request for responding online location information of equipment pertaining to the transmission source or other transmission destinations to said transmission source and said other transmission destinations in response to receiving of said first e-mail; a second e-mail receiving part for receiving third e-mail, which contains online location information of equipment pertaining to said transmission source or another transmission destination of said first e-mail, transmitted from said transmission source or said another transmission destination in accordance with said second e-mail; a transfer request transmitting part for transmitting a transfer request for transferring said attachment file to equipment pertaining to said transmission source or said another transmission destination in response to receiving of said third e-mail, when it is possible to access to said equipment pertaining to said transmission source or said another transmission destination based on online location information of equipment pertaining to said transmission source or said another transmission destination; an attachment file receiving part for receiving said attachment file transmitted from said transmission source or said another transmission destination in response to said transfer request; and an image forming part for forming images of said attachment file in response to the receiving by said attachment file receiving part.

(12) An image processing device comprising: a first e-mail receiving part for receiving e-mail having an attachment file; an image forming part for forming images for said attachment file; a second e-mail receiving part for receiving second e-mail containing a response request for responding its own online location information from another transmission destination of said first e-mail; an e-mail transmission part for transmitting third e-mail containing its own online location information to said another transmission destination in response to receiving of said second e-mail; a transfer request receiving part for receiving a transfer request for transferring said attachment file transmitted in response to said third e-mail by equipment pertaining to said another transmission destination; and an attachment file transfer part for transmitting said attachment file to equipment pertaining to said another transmission destination in response to said transfer request.

(13) An image processing device comprising: a first e-mail transmitting part for transmitting a first e-mail having an attached file; an e-mail receiving part for receiving second e-mail containing a response request for responding its own online location information from the transmission destination of said first e-mail; a second e-mail transmission part for transmitting third e-mail containing its own online location information to said transmission destination in response to receiving of said second e-mail; a transfer request receiving part for receiving a transfer request for transferring said attachment file transmitted from equipment pertaining to said transmission destination in response to said third e-mail; and an attachment file transfer part for transmitting said attachment file to equipment pertaining to said transmission destination in response to said transfer request.

(14) A mail server comprising: an e-mail receiving part for receiving e-mail having an attachment file; and an e-mail delivery part for delivering said e-mail deprived of said attachment file to the transmission destination of said e-mail when volume of said e-mail exceeds a specified capacity limit.

(15) An image processing method comprising: a step of receiving first e-mail transmitted with an attachment file but deprived of said attachment file due to a capacity limit of a relaying mail server; a step of transmitting second e-mail, which contains information of its own online location and a transfer request for transferring said attachment file, to the transmission source and other transmission destinations of said first e-mail in response to receiving of said first e-mail; a step of receiving said attachment file transmitted in response to said second e-mail from equipment pertaining to the transmission source or another transmission destination of said first e-mail; and a step of forming images of said attachment file in response to receiving of said attachment file.

(16) An image processing method comprising: a step of receiving first e-mail having an attachment file; a step of forming images for said attachment file; a step of receiving second e-mail, which contains online location information of equipment pertaining to another transmission destination of said first e-mail and a transfer request for transferring said attachment file, from said another transmission destination; and a step of transferring said attachment file to equipment pertaining to said another transmission destination in response to receiving of said second e-mail, when it is possible to access said equipment pertaining to said another transmission destination based on the online location information of said equipment pertaining to said another transmission destination.

(17) An image processing method comprising: a step of transmitting first e-mail having an attachment file; a step of receiving second e-mail containing online location information of equipment pertaining to transmission destination of said first e-mail and a transfer request for transferring said attachment file, from said transmission destination; and a step of transferring said attachment file to said equipment pertaining to said transmission destination in response to receiving of said second e-mail, when it is possible to access said equipment pertaining to said transmission destination based on online location information of said equipment pertaining to said transmission destination.

(18) An image processing method comprising: a step of receiving first e-mail transmitted with an attachment file but deprived of said attachment file due to a capacity limit of a relaying mail server; a step of transmitting second e-mail containing a response request for responding online location information of equipment pertaining to the transmission source or other transmission destinations to said transmission source and said other transmission destinations in response to receiving of said first e-mail; a step of receiving third e-mail, which contains online location information of equipment pertaining to said transmission source or another transmission destination of said first e-mail, transmitted from said transmission source or said another transmission destination in accordance with said second e-mail; a step of transmitting a transfer request for transferring said attachment file to equipment pertaining to said transmission source or said another transmission destination in response to receiving of said third e-mail, when it is possible to access to said equipment pertaining to said transmission source or said another transmission destination based on online location information of equipment pertaining to said transmission source or said another transmission destination; a step of receiving said attachment file transmitted from said transmission source or said another transmission destination in response to said transfer request; and a step of forming images of said attachment file in response to receiving of said attachment file.

(19) An image processing method comprising: a step of receiving e-mail having an attachment file; a step of forming images for said attachment file; a step of receiving second e-mail containing a response request for responding its own online location information from another transmission destination of said first e-mail; a step of transmitting third e-mail containing its own online location information to said another transmission destination in response to receiving of said second e-mail; a step of receiving a transfer request for transferring said attachment file transmitted in response to said third e-mail by equipment pertaining to said another transmission destination; and a step of transmitting said attachment file to equipment pertaining to said another transmission destination in response to said transfer request.

(20) An image processing method comprising: a step of transmitting a first e-mail having an attached file; a step of receiving second e-mail containing a response request for responding its own online location information from the transmission destination of said first e-mail; a step of transmitting third e-mail containing its own online location information to said transmission destination in response to receiving of said second e-mail; a step of receiving a transfer request for transferring said attachment file transmitted from equipment pertaining to said transmission destination in response to said third e-mail; and a step of transmitting said attachment file to equipment pertaining to said transmission destination in response to said transfer request.

(21) An e-mail delivery method comprising: a step of receiving e-mail having an attachment file; and a step of delivering said e-mail deprived of said attachment file to the transmission destination of said e-mail when volume of said e-mail exceeds a specified capacity limit.

(22) An image processing program for causing an image processing device to execute: a step of receiving first e-mail transmitted with an attachment file but deprived of said attachment file due to a capacity limit of a relaying mail server; a step of transmitting second e-mail, which contains information of its own online location and a transfer request for transferring said attachment file, to the transmission source and other transmission destinations of said first e-mail in response to receiving of said first e-mail; a step of receiving said attachment file transmitted in response to said second e-mail from equipment pertaining to the transmission source or another transmission destination of said first e-mail; and a step of forming images of said attachment file in response to receiving of said attachment file.

(23) An image processing program for causing an image processing device to execute: a step of receiving first e-mail having an attachment file; a step of forming images for said attachment file; a step of receiving second e-mail, which contains online location information of equipment pertaining to another transmission destination of said first e-mail and a transfer request for transferring said attachment file, from said another transmission destination; and a step of transferring said attachment file to equipment pertaining to said another transmission destination in response to receiving of said second e-mail, when it is possible to access said equipment pertaining to said another transmission destination based on the online location information of said equipment pertaining to said another transmission destination.

(24) An image processing program for causing an image processing device to execute: a step of transmitting first e-mail having an attachment file; a step of receiving second e-mail containing online location information of equipment pertaining to transmission destination of said first e-mail and a transfer request for transferring said attachment file, from said transmission destination; and a step of transferring said attachment file to said equipment pertaining to said transmission destination in response to receiving of said second e-mail, when it is possible to access said equipment pertaining to said transmission destination based on online location information of said equipment pertaining to said transmission destination.

(25) An image processing program for causing an image processing device to execute: a step of receiving first e-mail transmitted with an attachment file but deprived of said attachment file due to a capacity limit of a relaying mail server; a step of transmitting second e-mail containing a response request for responding online location information of equipment pertaining to the transmission source or other transmission destinations to said transmission source and said other transmission destinations in response to receiving of said first e-mail; a step of receiving third e-mail, which contains online location information of equipment pertaining to said transmission source or another transmission destination of said first e-mail, transmitted from said transmission source or said another transmission destination in accordance with said second e-mail; a step of transmitting a transfer request for transferring said attachment file to equipment pertaining to said transmission source or said another transmission destination in response to receiving of said third e-mail, when it is possible to access to said equipment pertaining to said transmission source or said another transmission destination based on online location information of equipment pertaining to said transmission source or said another transmission destination; a step of receiving said attachment file transmitted from said transmission source or said another transmission destination in response to said transfer request; and a step of forming images of said attachment file in response to receiving of said attachment file.

(26) An image processing program for causing an image processing device to execute: a step of receiving e-mail having an attachment file; a step of forming images for said attachment file; a step of receiving second e-mail containing a response request for responding its own online location information from another transmission destination of said first e-mail; a step of transmitting third e-mail containing its own online location information to said another transmission destination in response to receiving of said second e-mail; a step of receiving a transfer request for transferring said attachment file transmitted in response to said third e-mail by equipment pertaining to said another transmission destination; and a step of transmitting said attachment file to equipment pertaining to said another transmission destination in response to said transfer request.

(27) An image processing program for causing an image processing device to execute: a step of transmitting a first e-mail having an attached file; a step of receiving second e-mail containing a response request for responding its own online location information from the transmission destination of said first e-mail; a step of transmitting third e-mail containing its own online location information to said transmission destination in response to receiving of said second e-mail; a step of receiving a transfer request for transferring said attachment file transmitted from equipment pertaining to said transmission destination in response to said third e-mail; and a step of transmitting said attachment file to equipment pertaining to said transmission destination in response to said transfer request.

(28) An e-mail delivery program for causing an e-mail server to execute: a step of receiving e-mail having an attachment file; and a step of delivering said e-mail deprived of said attachment file to the transmission destination of said e-mail when volume of said e-mail exceeds a specified capacity limit.

BRIEF DESCRIPTION OF THE DRAWINGS

As shown in Fig.2, MFP 11a, 12a, 13a, and 14a are each equipped with a CPU 101, a ROM 102, a RAM 103, a hard disk 104, an operating (control) panel unit 105, an image scanning unit 106, a printing unit 107, and a network interface 108. These constituent components are interconnected via a bus 109 for the purpose of signal exchanges.

FIG. 6 shows an example of e-mail generated by MFP 14a according to this embodiment.

FIG. 8 shows an example of e-mail, wherein the attachment file is removed due to the capacity limit as it is being delivered by mail server 21a to MFP 11a according to this embodiment.

FIG. 11 shows an example of attachment file transfer request mail transmitted by MFP 11a to the transmission source and other transmission destinations according to this embodiment.

FIG. 17 shows an example of IP address response request mail transmitted by MFP 11b to the transmission source and other transmission destinations according to this embodiment.

FIG. 18 shows an example of IP address response mail responded by MFP 12b to MFP 11b according to this embodiment.

DESCRIPTION OF THE PREFERRED EMBODIMENTS

The preferred embodiments of the invention will be described in detail below with reference to the accompanying drawings.

Figure 1:
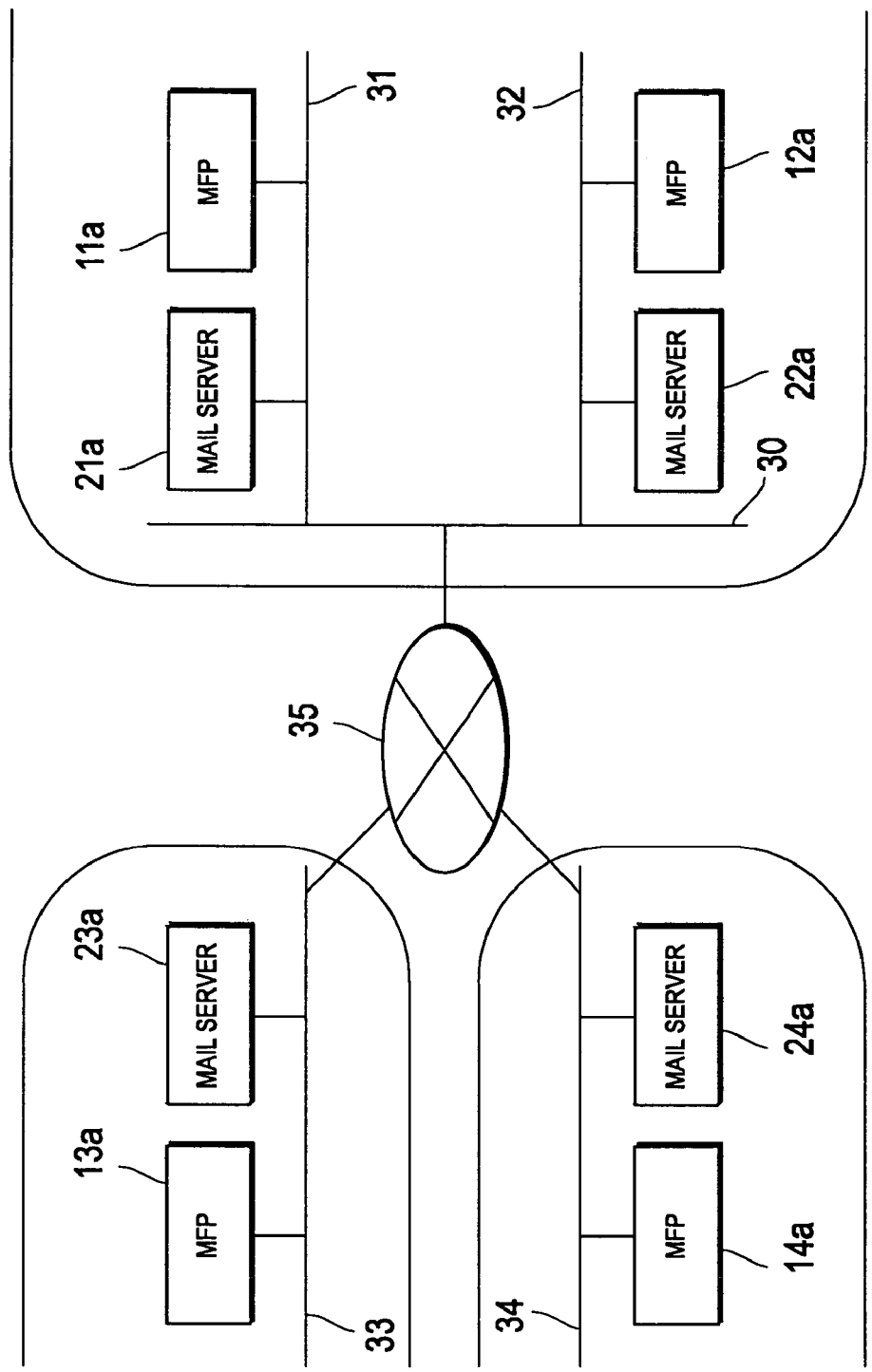
FIG. 1 is a block diagram showing the entire constitution of an image processing system including an image processing device according to a first embodiment of the present invention.

FIG. 1 is a block diagram showing the entire constitution of an image processing system including an image processing device according to a first embodiment of the present invention. The image processing system according to this embodiment is equipped with an image processing device consisting of MFP 11a, 12a, 13a and 14a and mail servers 21a, 22a, 23a, and 24a, wherein pairs of MFP 11a and mail server 21a, MFP 12a and mail server 22a, MFP 13a and mail server 23a, and MFP 14a and mail server 24a are each communicably connected via networks 31, 32, 33 and 34 respectively. Moreover, networks 31 and 32 constitutes a portion of a network 30, while networks 30, 33 and 34 are all connected to a network 35. The types and the number of equipment to be connected to networks 30 through 35 are not limited to those shown in FIG. 1.

Next, constitution of each device mentioned above will be described below, but the description of a function common to multiple devices will be made only once when it appears and will not be repeated afterwards in order to avoid duplicate descriptions.

Figure 2:
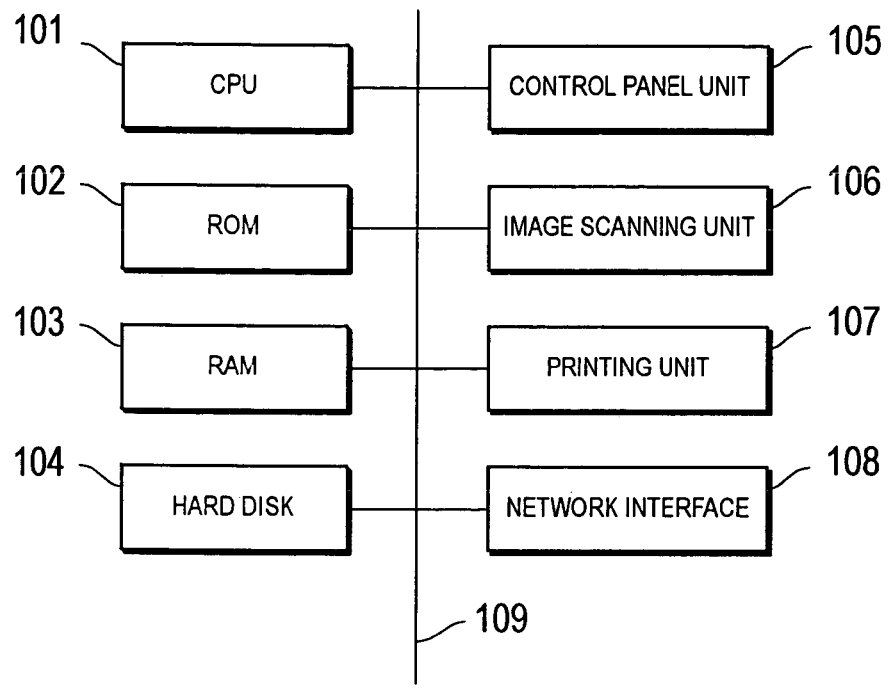
FIG. 2 is a block diagram showing the constitution of MFP 11a, 12a, 13a and 14a pertaining to this embodiment.

FIG. 2 is a block diagram showing the constitution of MFP 11a, 12a, 13a and 14a pertaining to this embodiment. As shown in FIG. 2, MFP 11a, 12a, 13a and 14a are each equipped with a CPU 101, a ROM 102, a RAM 103, a hard disk 104, an operating (control) panel unit 105, an image scanning unit 106, a printing unit 107, and a network interface 108. These constituent components are interconnected via a bus 109 for the purpose of signal exchanges.

CPU 101 controls various parts indicated above and executes various arithmetic processes according to a program. ROM 102 stores various programs and parameters. RAM 103 stores programs and data temporarily as a working area. Hard disk 104 stores various programs and parameters and is used for storing image data acquired by image processing, etc. In this embodiment, MFP 11a, 12a, 13a and 14a perform various operations to be described later and the programs for controlling such operations of MFP are stored either in ROM 102 or hard disk 104, and are executed by CPU 101 after they are read from RAM 103 during the start of an operation.

Operating panel unit 105 is equipped with a touch screen where various kinds of information are displayed, a ten-key pad to be used for setting up the number of copies to be produced and the like, a start key for instructing the start of an operation, a stop key for instructing the stoppage of an operation, a reset key for initializing various setup conditions, etc.

Image scanning unit 106 casts light on a document set on a specified location from a light source such as a fluorescent lamp and the like, converts reflected lights from the document surface into electrical signals with the use of light sensitive devices such as CCD or CIS, and generates image data (bitmap data) from the electrical signals. Image scanning unit 106 is also equipped with an automatic document feeder ("ADF") that transfers a document consisting of multiple sheets one sheet at a time to the specified location so that they can be scanned sequentially.

Printing unit 107 prints the image data after image processing according to the setup condition.

Network interface 108 is an interface for allowing the system to access a network and communicate with other equipments on the network.

Since MFP 11a, 12a, 13a and 14a are constituted as described above, they have a function as a scanner for scanning the document, a function as a printer for printing the image data received from another equipment on the network, and a function as a copying machine for scanning the document and printing the image data.

MFP 11a, 12a, 13a and 14a also have functions of transmitting and receiving e-mail and are capable of transmitting and receiving to and from other communication equipments on network 35 having functions of transmitting and receiving e-mail via networks 30, 31, 32, 33 and 34, mail servers 21a, 22a, 23a and 24a, and network 35. Therefore, they have functions to attach image data acquired by scanning the document image or another files to e-mail, and to develop files attached to e-mail received into bitmaps to be issued for printing.

Figure 3:
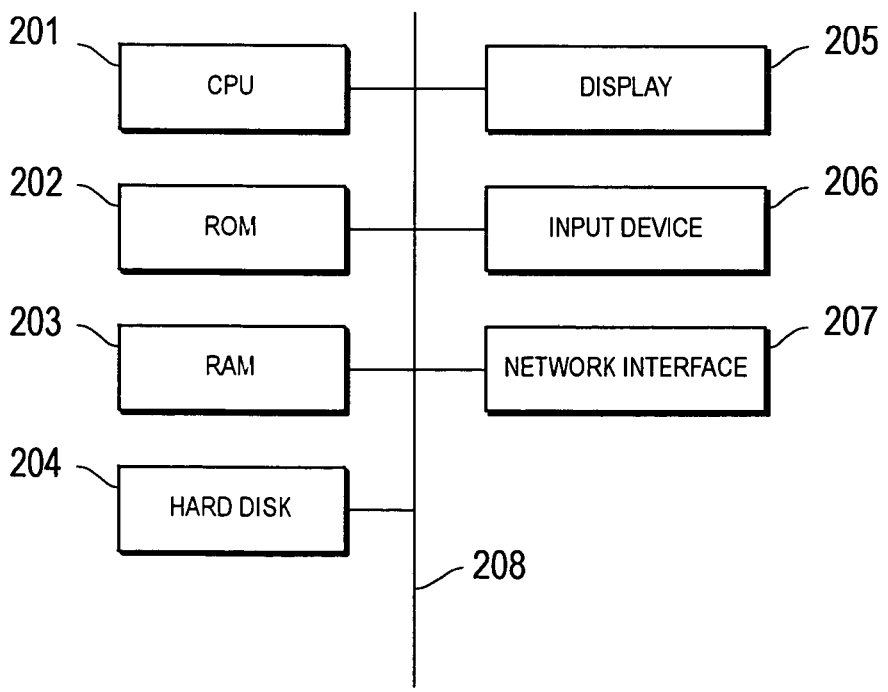
FIG. 3 is a block diagram showing an example of the constitution of mail servers 21a, 22a, 23a and 24a pertaining to this embodiment.

FIG. 3 is a block diagram showing an example of the constitution of mail servers 21a, 22a, 23a and 24a pertaining to this embodiment. Mail servers 21a, 22a, 23a and 24a are computers that provide e-mail reception and transmission services for MFP 11a, 12a, 13a and 14a respectively, and are equipped with a CPU 201, a ROM 202, a RAM 203, a hard disk 204, a display 205, an input device 206, a network interface 207 and a bus 208.

Display 205 displays various matters. Input device 206 consists of a keyboard, a mouse and others, and is used for making various kinds of inputs.

While each of mail servers 21a, 22a, 23a and 24a provide services of e-mail transmission and reception using a single computer, SMTP protocol for transmission, and IMAP 4, POP 3 and other protocols for reception, it is also possible to have separate mail servers, one for reception and another for transmission using separate computers.

Each mail server generally has a capacity limitation for e-mail it handles in order to prevent problems such as system breakdown due to overloading by e-mail it handles; as such, each of mail servers 21a, 22a, 23a and 24a is set up with a capacity limit for e-mail and is capable of transferring or delivering e-mail received by removing the attachment file if the attachment file exceeds the specified capacity limit.

Networks 30, 31, 32, 33 and 34 are internal networks (intranets) consisting of LANs created by connecting computers and network equipment based on standards such as Ethernet®, Token Ring, and FDDI, or WANs consisting of LANs connected with each other by means of dedicated lines, and network 35 represents an external network such as the Internet or public networks consisting of LANs and WANs interconnected to each other.

Next, the outline of the image processing system according to this embodiment will be described below. With respect to this embodiment, it is described hereunder a case where e-mail with an attachment file containing image data is acquired by scanning a document image and is transmitted by MFP 14a to MFP 11a, 12a and 13a to be printed out by MFP 11a, 12a and 13a. Mail servers 21a, 22a, 23a and 24a have upper limits as to the e-mail capacity that can be handled by each of them and it is assumed here that the e-mail that MFP 14a is transmitting exceeds only the capacity limit of mail server 21a, which is the mail server of MFP 11a, and that it does not exceed the capacity limits of the other mail servers (the same assumption applies to all other embodiments of the present invention).

Figure 4:
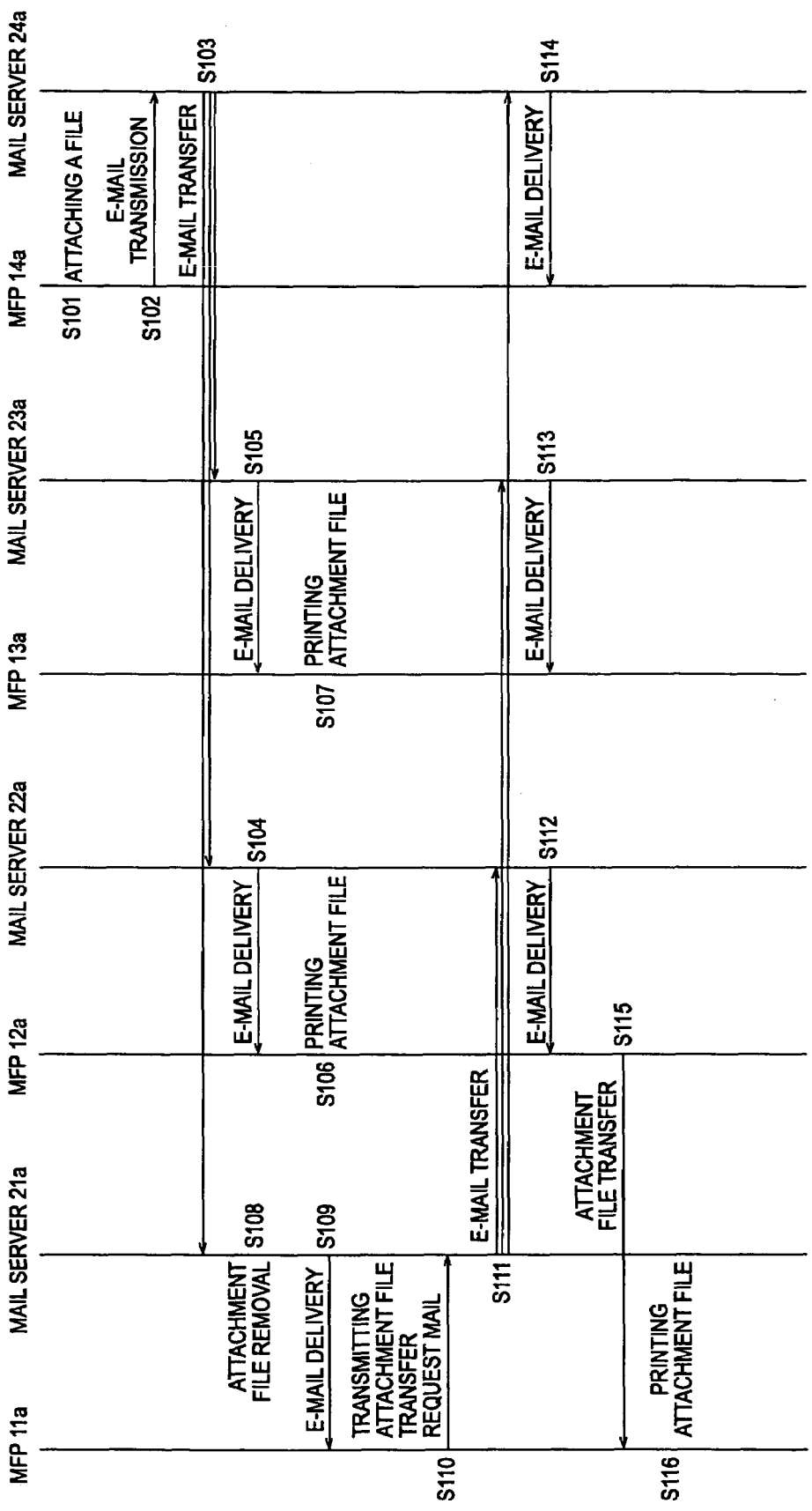
FIG. 4 is a sequence chart showing the image processing procedure of an image processing system according to this embodiment.

First, let us make a brief description of the procedures of the image process of the entire image processing system according to the present embodiment. FIG. 4 is a sequence chart showing the image processing procedure of the image processing system according to this embodiment. In FIG. 4, MFP 14a acquires the image data by scanning the document image, prepares e-mail attached with a file containing said image data (S101), and transmits the e-mail to its transmission destinations, MFP 11a, 12a and 13a (S102). When mail server 24a receives the e-mail from MFP 14a, it then transfers the received e-mail to mail servers 21a, 22a and 23a (S103).

When mail servers 22a and 23a receive the e-mail from mail server 24a, they deliver the received e-mail to MFP 12a and 13a (S104 and S105). Incidentally, it is assumed here that the mail servers' actions of delivering the e-mail to their clients (transmission destination devices) include modes of operations such that a transmission destination device downloads e-mail addressed to its own mailing address upon receiving an e-mail receiving notice from a monitoring program on its mail server, or by accessing its mail server regularly on a specified timing or on an arbitrary timing (the same assumption applies to all other cases throughout the specification). Upon receiving the e-mail from mail servers 22a and 23a, MFP 12a and 13a develop the attachment file of the received e-mail into bitmap data and print them out (S106 and S107).

On the other hand, upon receiving the e-mail from mail server 24a, mail server 21a removes the attachment file as the received e-mail exceeds the capacity limit (S108), and delivers the e-mail without the attachment file to MFP 11a (S109).

Upon receiving the e-mail from mail server 21a, as the attachment file of said e-mail is removed due to the capacity limitation of mail server 21a, MFP 11a transmits e-mail (attachment file transfer request mail) that contains its own IP address (i.e., information of its own online location) and a transfer request to MFP 14a, which is the transmission source of said e-mail, as well as to other transmission destinations MFP 12a and 13a (S110). Upon receiving the attachment file transfer request mail from MFP 11a, mail server 21a transfers it to mail servers 22a, 23a and 24a (S111); upon receiving it, mail servers 22a, 23a and 24a deliver it to MFP 12a, 13a and 14a, respectively (S112, S113 and S114).

Upon receiving the attachment file transfer request mail, MFP 12a, 13a and 14a try to access MFP 11a based on the IP address of MFP 11a contained in the attachment file transfer request mail. Since MFP 11a is on the external network, MFP 13a and MFP 14a are prevented from accessing MFP 11a by means of protective walls such as firewalls. On the other hand, since MFP 12a is located within the same internal network as MFP 11a, it can access MFP 11a via networks 32, 30 and 31. Therefore, MFP 12a transfers said attachment file it has received and kept to MFP 11a via network (S115). Upon receiving said attachment file from MFP 12a, MFP 11a develops the received attachment file into bitmap data and prints it out (S116).

Figure 5:
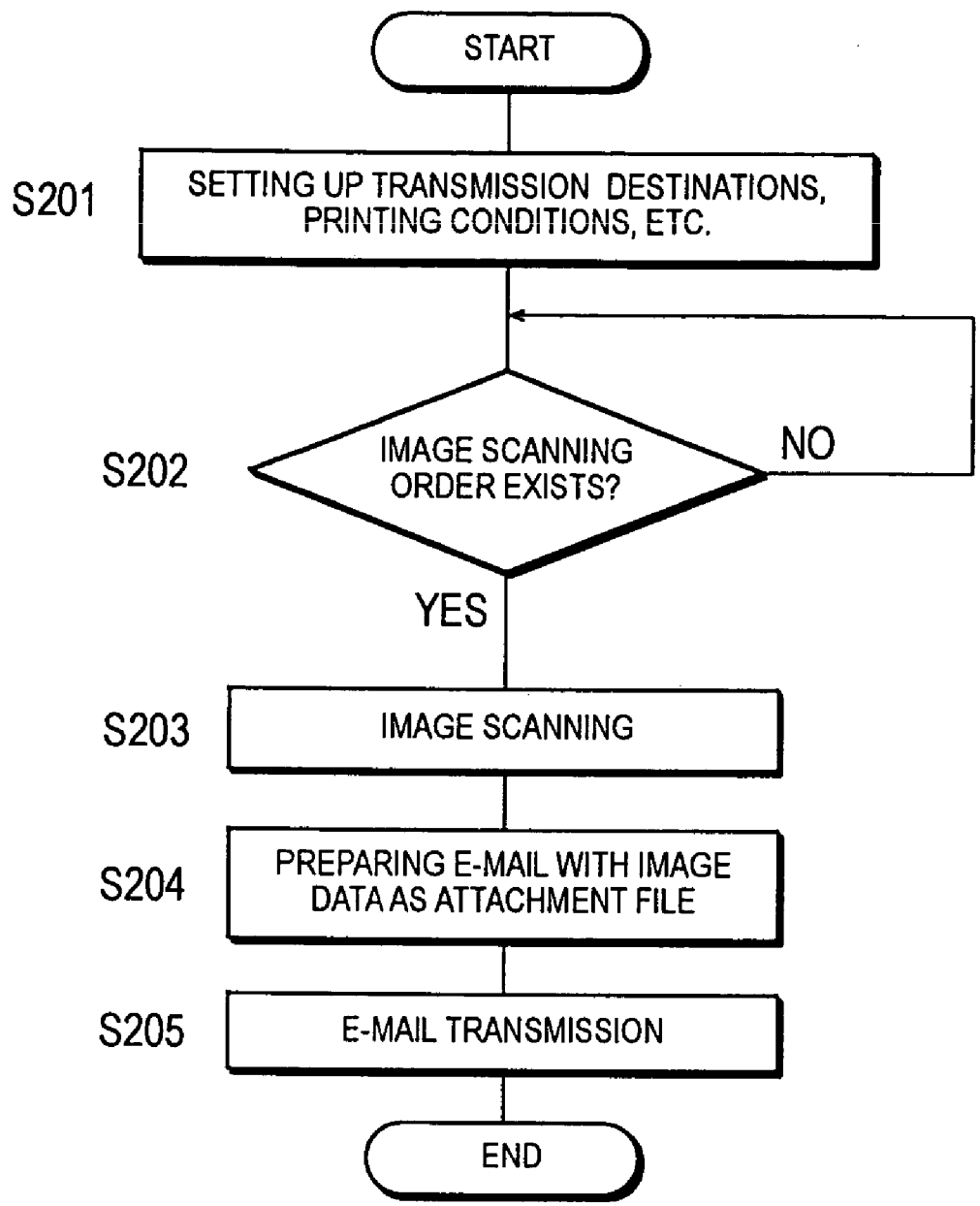
FIG. 5 is a flowchart for describing the steps of the e-mail transmitting process of MFP 14a according to this embodiment.

Next, let us describe in detail the key procedures of the image processing of each device in this embodiment. FIG. 5 is a flowchart for describing the procedure of the e-mail transmitting process of MFP 14a, which is the transmission source of the e-mail according to this embodiment. In FIG. 5, MFP 14a sets up the transmission destinations of the e-mail, the printing conditions of the attachment file and others according to the input from the user (S201). Using operating panel unit 105, the user enters e-mail addresses of the transmission destinations of the e-mail, i.e., MFP 11a, 12a and 13a, the printing conditions of the attachment file, the image scanning conditions such as resolution, size, distinction of color vs. monochromatic, and type of file of the acquired image data, etc. After setting up the transmission destinations of the e-mail, etc., MFP 14a waits for an image scanning order (S202: No). The user sets up the document at a specified location on the document table and presses the start key on operating panel unit 105. Upon receiving a scanning order (S202: yes), MFP 14a scans the document image based on the image scanning condition by means of image scanning unit 106 and stores the image data thus acquired on hard disk 104 (S203).

Next, MFP 14a prepares an e-mail message accompanied with the acquired image data as an attachment file based on the e-mail transmission destinations and the printing conditions and others set up in step S201 (S204). FIG. 6 is an example of e-mail generated by MFP 14a according to this embodiment. In FIG. 6, the transmission destination box of e-mail 41 shows the e-mail address of MFP 11a, "mfp11a@mail21a.net30.com" ("To"), as well as the e-mail addresses of MFP 12a and 13a, "mfp12@mail22a.net30.com" and "mfp13a@mail23a.net33.com" ("Cc"), as the e-mail transmission destinations set up in step S201. In the attachment file box of e-mail 41 contains an image file "scan#001.jpg" pertaining to the image data acquired in step S203 and the body includes the printing condition of the attached file set up in step S201. MFP 14a transmits the prepared e-mail to mail server 21a via network interface 108 and network 34 (S205).

Files to be attached to e-mail in the e-mail transmission procedure for MFP 14a described above are not necessarily limited to the image data acquired by image scanning unit 106, but can be files of various file formats acquired from other equipments on the network, in which case MFP 14a prepares the e-mail by receiving the files to be attached via network 34 and network interface 108.

Figure 7:
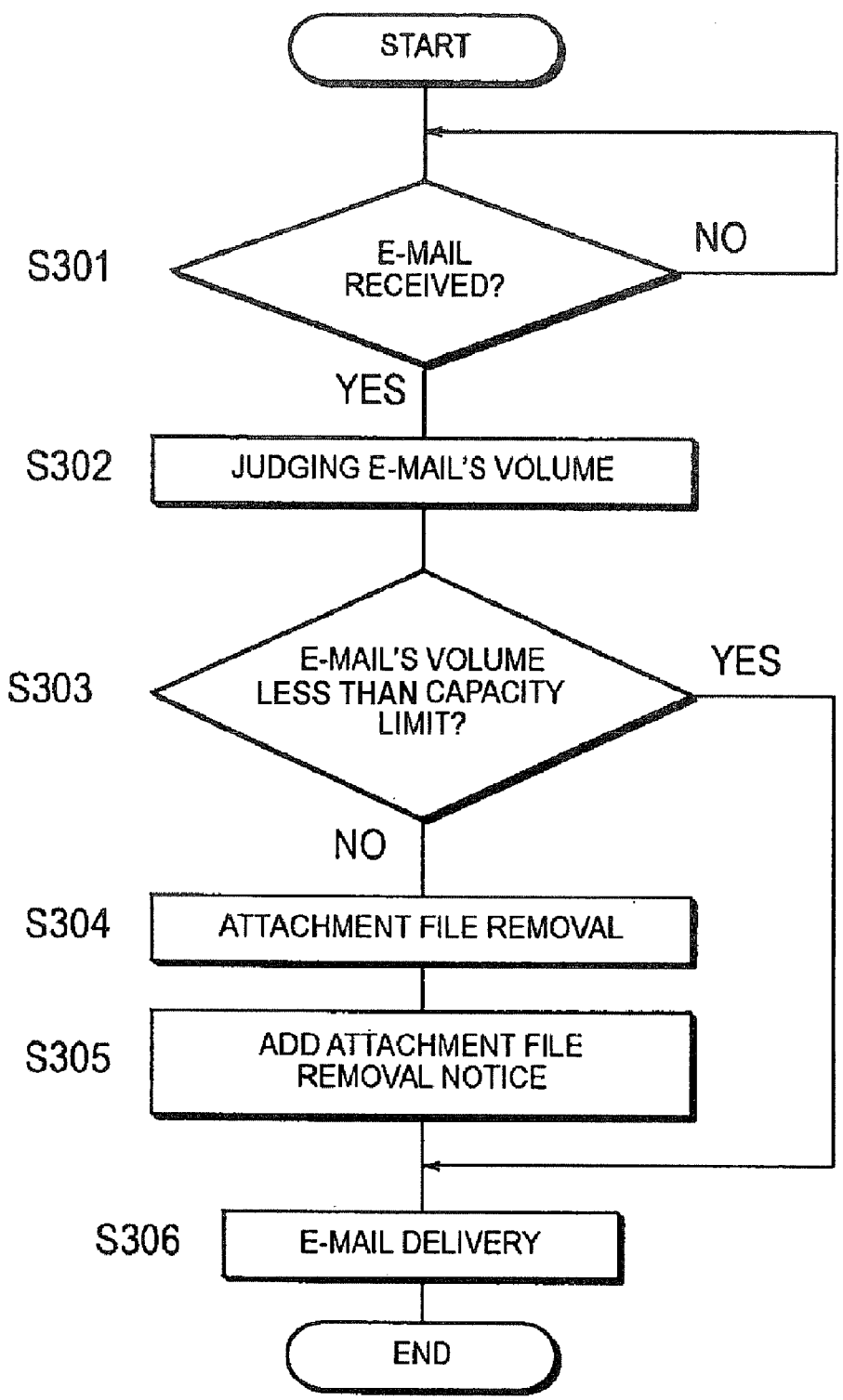
FIG. 7 is a flowchart showing the steps of the e-mail delivery process of mail server 21a to MFP 11a according to this embodiment.

FIG. 7 is a flowchart showing the steps of the e-mail delivery process of mail server 21a to MFP 11a according to this embodiment. The procedures of e-mail delivery processes by mail servers 22a and 23a to MFP 12a and 13a are similar to the above. In FIG. 7, mail server 21a waits for e-mail from other mail servers (S301: No). When e-mail is received from another mail server via networks 35, 30 and 31 (S301: Yes), the volume of the received e-mail is checked (S302), the volume of the received e-mail is compared with the upper limit of the capacity and, if it is less than the upper limit (S303: Yes), the received e-mail is delivered to MFP 11a; in other words, it is then stored in a mail box of the hard disk of mail server 21a pertaining to the mail address of MFP 11a (S306). The upper limit for the e-mail's volume is set up in advance by the manager of mail server 21a through input device 206 and is stored in hard disk 204, etc.

On the other hand, if the volume of the received e-mail exceeds the capacity upper limit (S303: No), the attachment file of said e-mail is removed (S304), and a notice that the attachment file is removed due to the capacity limit ("attachment file removal notice") is added to said e-mail (S305) and is delivered to MFP 11a (S306). FIG. 8 shows an example of electronic mail, wherein the attachment file is removed due to the capacity limit as it is being delivered by mail server 21a to MFP 11a according to this embodiment. In FIG. 8, e-mail 42 has the same content as that of e-mail 41 except that the attachment file, "scan#001.jpg" is removed and that an attachment file removal notice is added in the body notifying that the attachment file is removed due to the capacity limit. As can be seen from the above, the attachment file removal notice to be included in the e-mail deprived of the attachment file due to the capacity limit can be either added to the body of the e-mail or can be made as separate text file to be attached to the e-mail.

Figure 9:
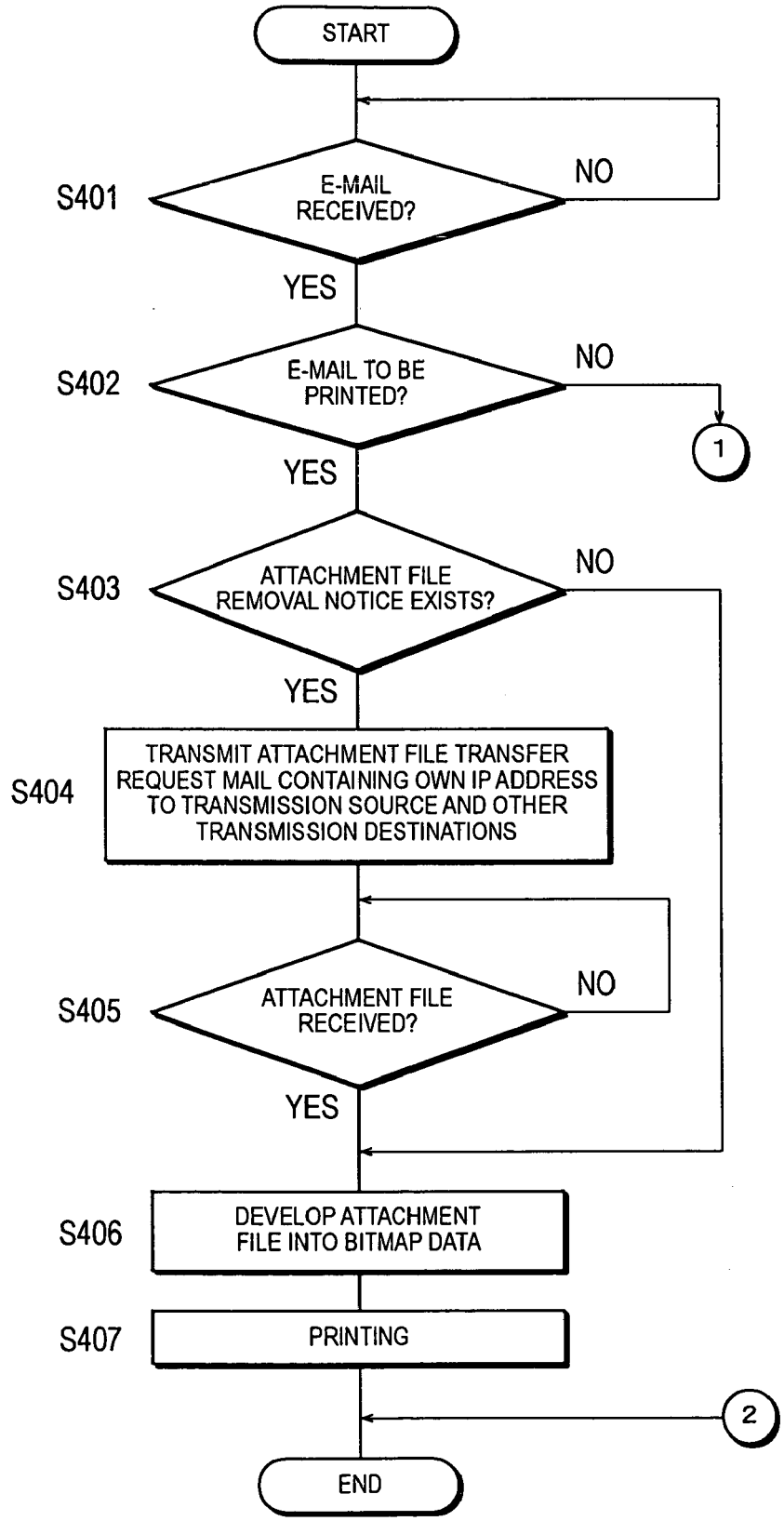
FIG. 9 and FIG. 10 are a flowchart showing the image forming process of MFP 11a according to this embodiment.
Figure 10:
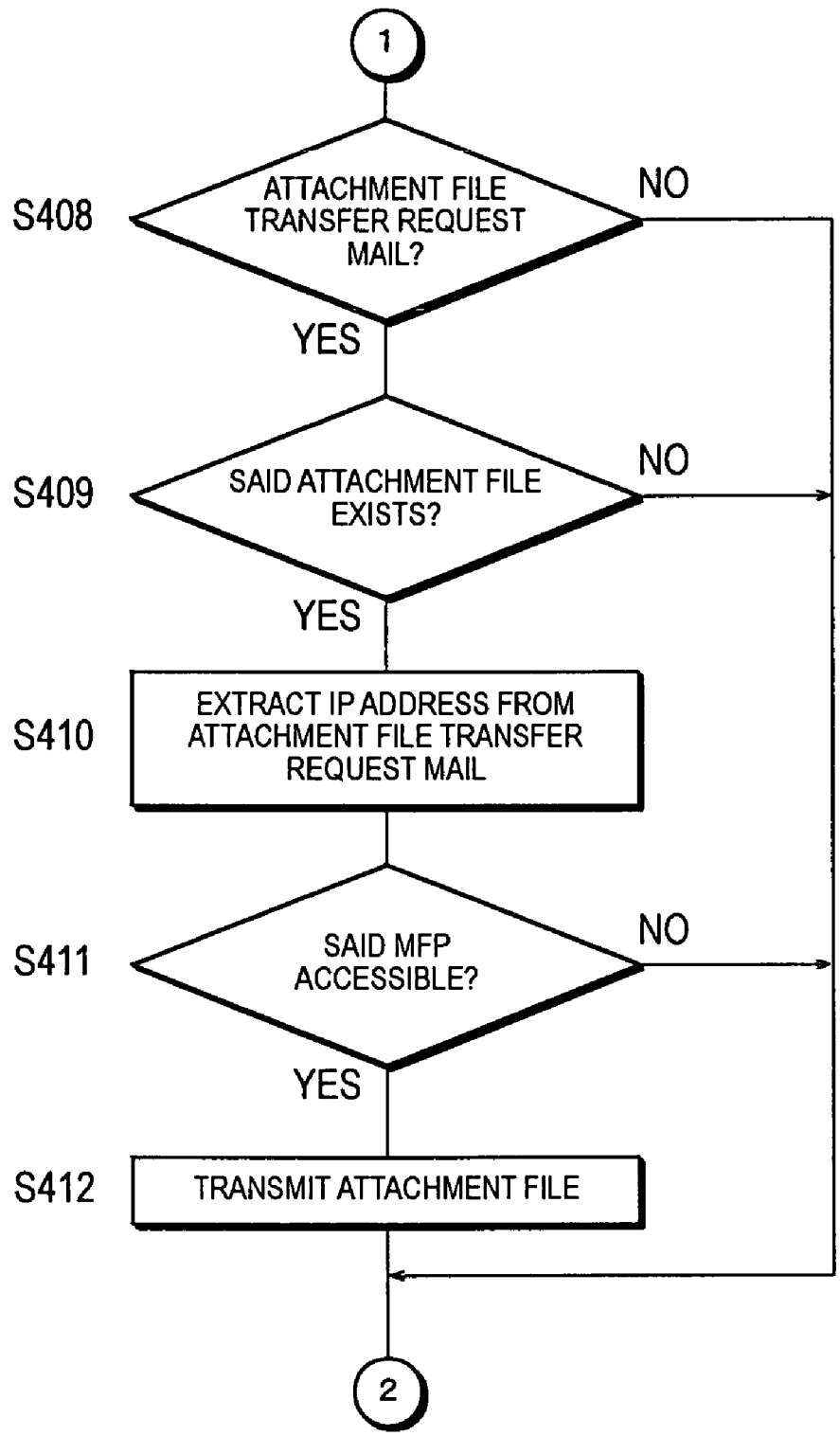

FIG. 9 and FIG. 10 are a flowchart showing procedure of the image forming process of MFP 11a, which is the e-mail transmission destination according to this embodiment. The procedures of the image forming processes for MFP 12a, 13a and 14a are similar to this. In FIG. 9 and FIG. 10, MFP 11a waits for the e-mail to arrive (S401: No). Upon receiving the mail arrival notice from a monitoring program on mail server 21a, or accessing mail server 21a periodically on a regular timing or an arbitrary timing, MFP 11a receives e-mail addressed to its own mail address (S401: Yes), and stores the received e-mail on hard disk 104. Next, a judgment as to whether the received e-mail is concerned with e-mail printing is made from the mail title and the contents of the body, etc. If it is judged to be e-mail concerning e-mail printing (S402: Yes), a further judgment is made as to whether an attachment file removal notice is included. If no attachment file removal notice is included (S403: No), the attachment file of said e-mail is developed into bit map data (S406), and it is printed out by printing unit 107 (S407).

In step S403, if an attachment file removal notice is included (S403: Yes), attachment file transfer request mail containing its own IP address is transmitted to the transmission source and other transmission destinations of said e-mail (S404). FIG. 11 is an example of attachment file transfer request mail transmitted by MFP 11 to the transmission source and other transmission destinations according to this embodiment. In FIG. 11, attachment file transfer request mail 43 has the mail addresses of MFP 14a, which is the transmission source of e-mail 42, as well as MFP 12a and 13a, which are the other transmission destinations of e-mail 42, set up as the transmission destinations. Also, the body of attachment file transfer request mail 43 contains an attachment file transfer request requesting the removed attachment file "scan#001.jpg" be transferred to "111.222.333.444" which is the IP address of MFP 11a.

In FIG. 9 and FIG. 10, after transmitting the attachment file transfer request, MFP 11a waits until the attachment file is received (S405: No); upon receiving the attachment file from an MFP of the transmission source or another transmission destination via network 31 and network interface 108 (S405: Yes), it stores the received attachment file on the hard disk 104, develops the attachment file into bitmap data (S406), and prints it out by means of printing unit 107 (S407).

It is also possible to constitute the system in such a way that MFP 11a conducts access certification when an MFP pertaining to said transmission source or another transmission destination attempts to access MFP 11a in order to transmit the attachment file, wherein the file transfer request mail that MFP 11a transmits to the transmission source and other transmission destinations contains an ID, a password and the like required for said certification, so that the MFP pertaining to said transmission source or another transmission destination requests certification using the ID, password, and the like.

On the other hand, if the e-mail received at step S401 happens to be attachment file transfer request mail from another MFP (S401: Yes; S402: No; S408: Yes), there may be a chance that the attachment file cannot be received even at MFP 11a, so that hard disk 104 is checked to see if it contains the attachment file related to the transfer request. If said attachment file is contained (S409: Yes), the IP address of said another MFP contained in the attachment file transfer request mail together with the attachment file transfer request is extracted (S410). If it is possible to access to said another MFP based on the extracted IP address (S411: Yes), the attachment file is transferred to said another MFP via network inter face 108 and network 31 (S412).

Figure 12:
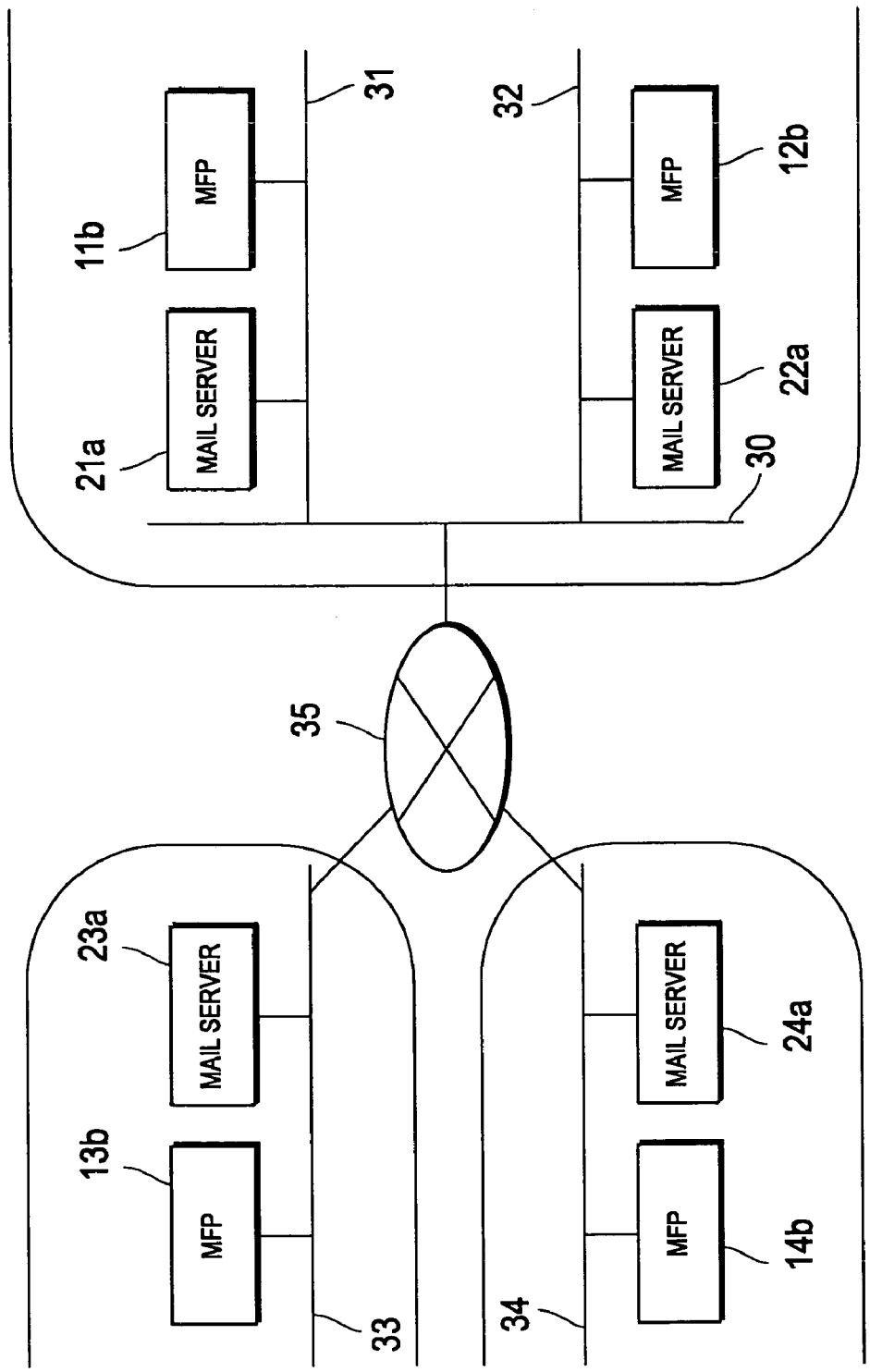
FIG. 12 is a block diagram showing the entire constitution of an image processing system including an image processing device according to a second embodiment of the present invention.

FIG. 12 is a block diagram showing the entire constitution of an image processing system including an image processing device according to a second embodiment of the present invention. The image processing system according to this embodiment is equipped with MFP 11b, 12b, 13b and 14b as the image processing device as well as mail servers 21a, 22a, 23a and 24a, and all of them are interconnected so that they can communicate with each other via network 30, 31, 32, 33, 34 and 35 similar to the first embodiment described above. The constitutions and functions of MFP 11b, 12b, 13b and 14b are similar to those of MFP 11a, 12a, 13a and 14a in the first embodiment, and the constitutions and functions of mail servers 21a, 22a, 23a and 24a as well as networks 30, 31, 32, 33, 34 and 35 are similar to the corresponding items of the first embodiment.

Figure 13:
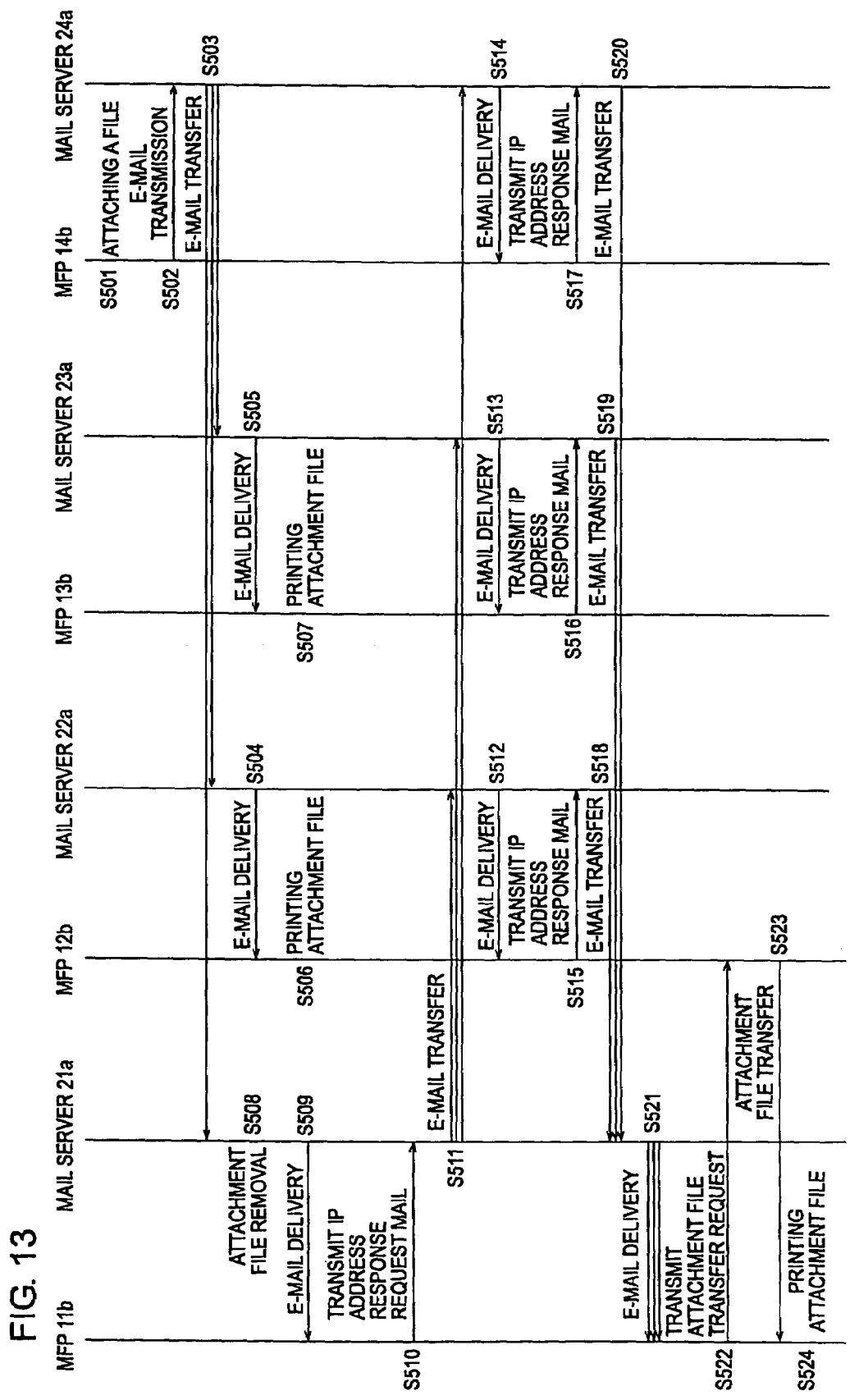
FIG. 13 is a sequence chart showing the image processing procedure of the image processing system according to this embodiment.

Next, the outline of the image processing system according to this embodiment will be described below. FIG. 13 is a sequence chart showing the image processing procedure of the image processing system according to this embodiment. In FIG. 13, MFP 14b transmits e-mail attached with image data, which is acquired by scanning the document, to MFP 11b, 12b and 13b in a similar manner as in the operation of MFP 14a of the image processing system according to the first embodiment. MFP 12b and 13b receive said e-mail and print the attachment file, while MFP 11b receives e-mail deprived of the attachment file due to the capacity limit of mail server 21a (S501-S509).

Upon receiving the e-mail deprived of the attachment file from mail server 21a, MFP 11b transmits e-mail for requesting response of IP address (IP address response request mail) to MFP 14b, which is the transmission source, and MFP 12b and 13b, which are other transmission destinations of said e-mail (S510). Upon receiving the IP address response request mail from MFP 11b, mail server 21a transmits it to mail servers 22a, 23a and 24a (S511), and mail servers 22a, 23a and 24a receive it and deliver it to MFP 12b, 13b and 14b, respectively (S512, S513 and S514).

Upon receiving the IP address response request mail, MFP 12b, 13b and 14b transmit response e-mail messages containing their own IP addresses (IP address response mail) to MFP 11b respectively (S515, S516 and S517); upon receiving them, mail servers 22a, 23a and 24a transmits them to mail server 21a (S518, S519 and S520), upon receiving them, mail server 21a delivers them to MFP 11b (S521).

Upon receiving IP address response mail messages from MFP 12b, 13b and 14b, MFP 11b attempts to access each MFP based on the IP addresses contained in the received IP address response mail messages. MFP 13b and MFP 14b are inaccessible due to protective walls such as firewalls as they are located on external networks, while MFP 12b is located within the same internal network so that it is accessible via networks 31, 30 and 32. Therefore, MFP 11b transmits a transfer request for said attachment file to MFP 12b via the networks (S522), upon receiving it, MFP 12b transmits said attachment file to MFP 11b via the networks (S523). Upon receiving said attachment file from MFP 12b, MFP 11b develops the received attachment file into bitmap data and prints it out (S524).

Figure 14:
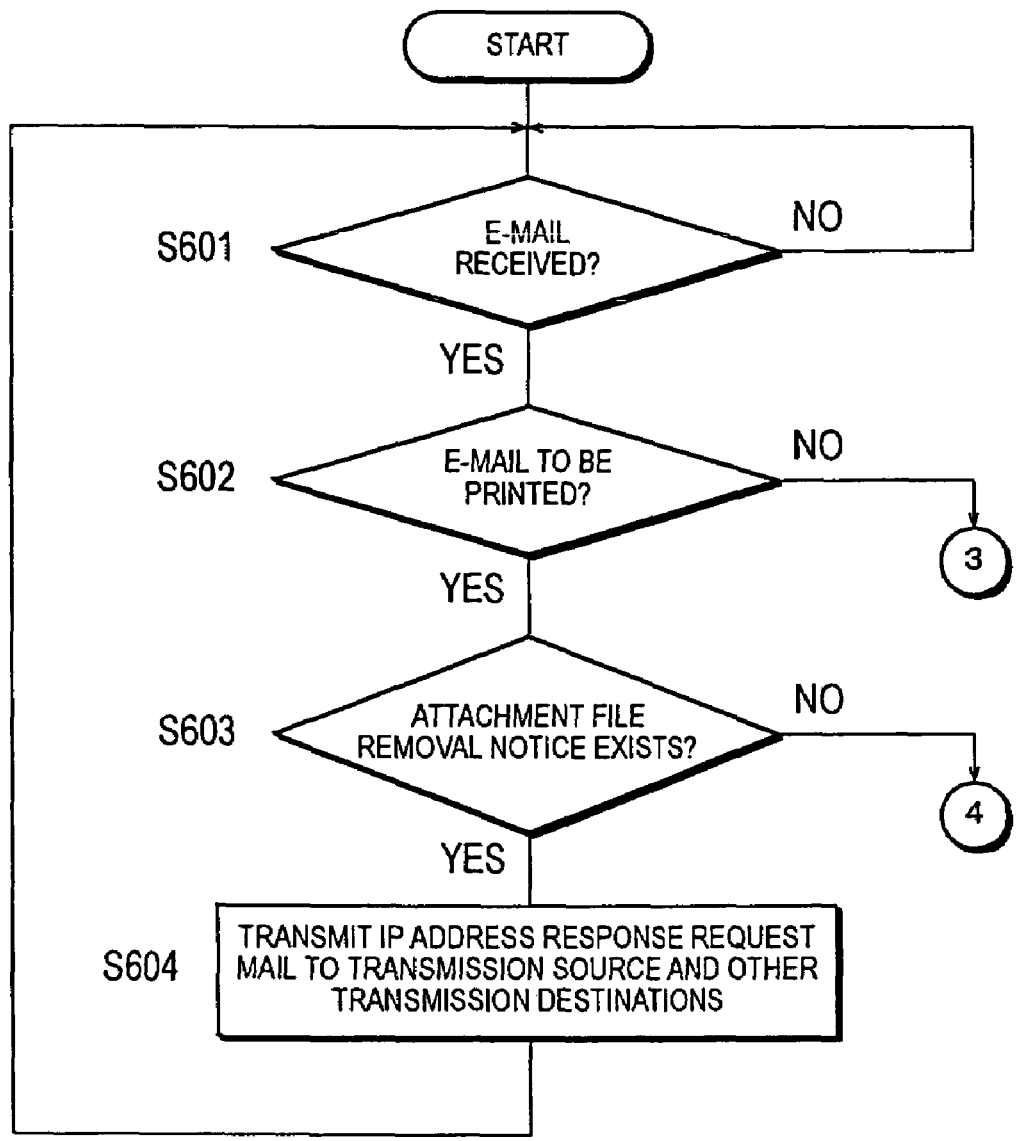
FIGS. 14-16 are a flowchart showing the image forming process of MFP 11b according to this embodiment.
Figure 15:
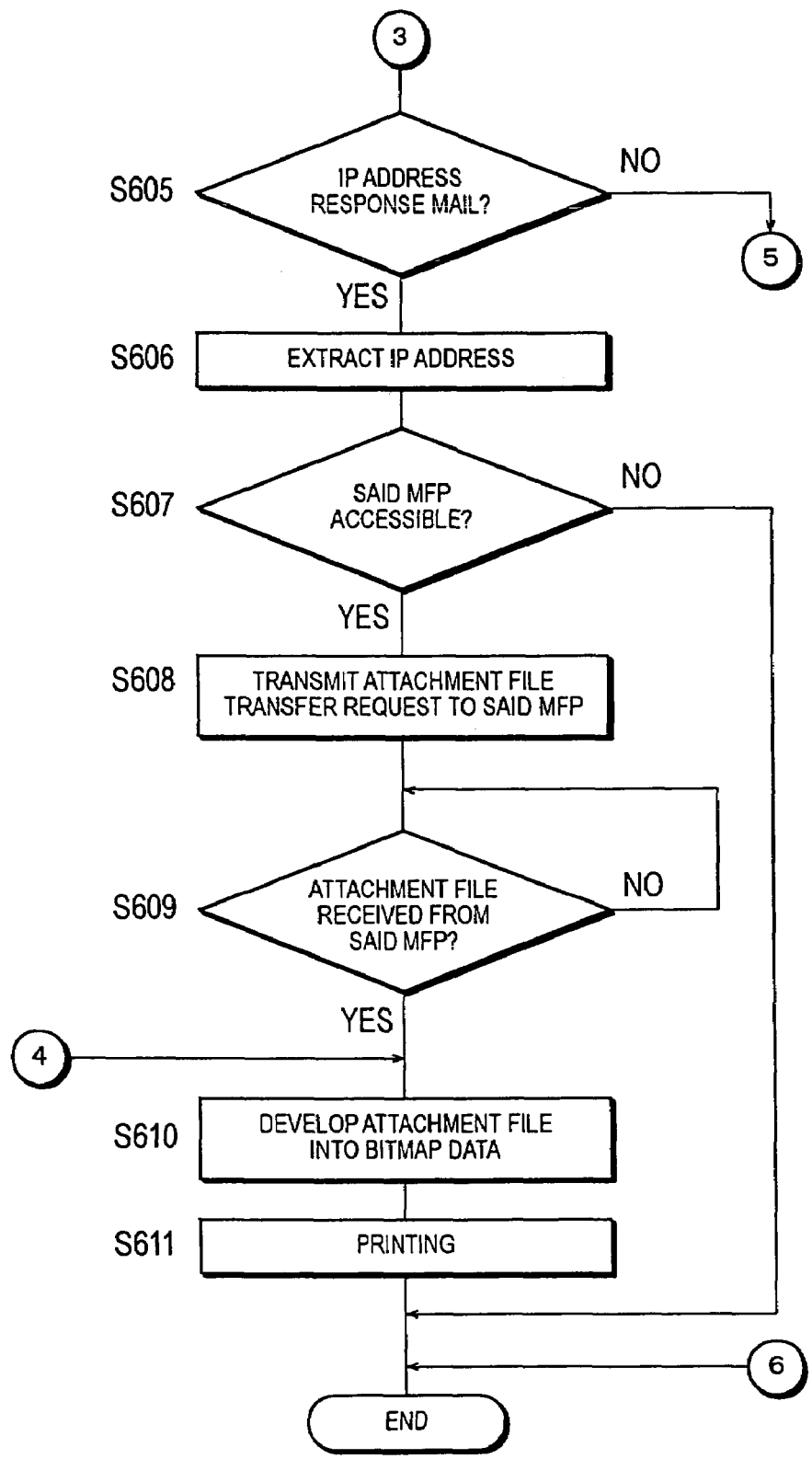
Figure 16:
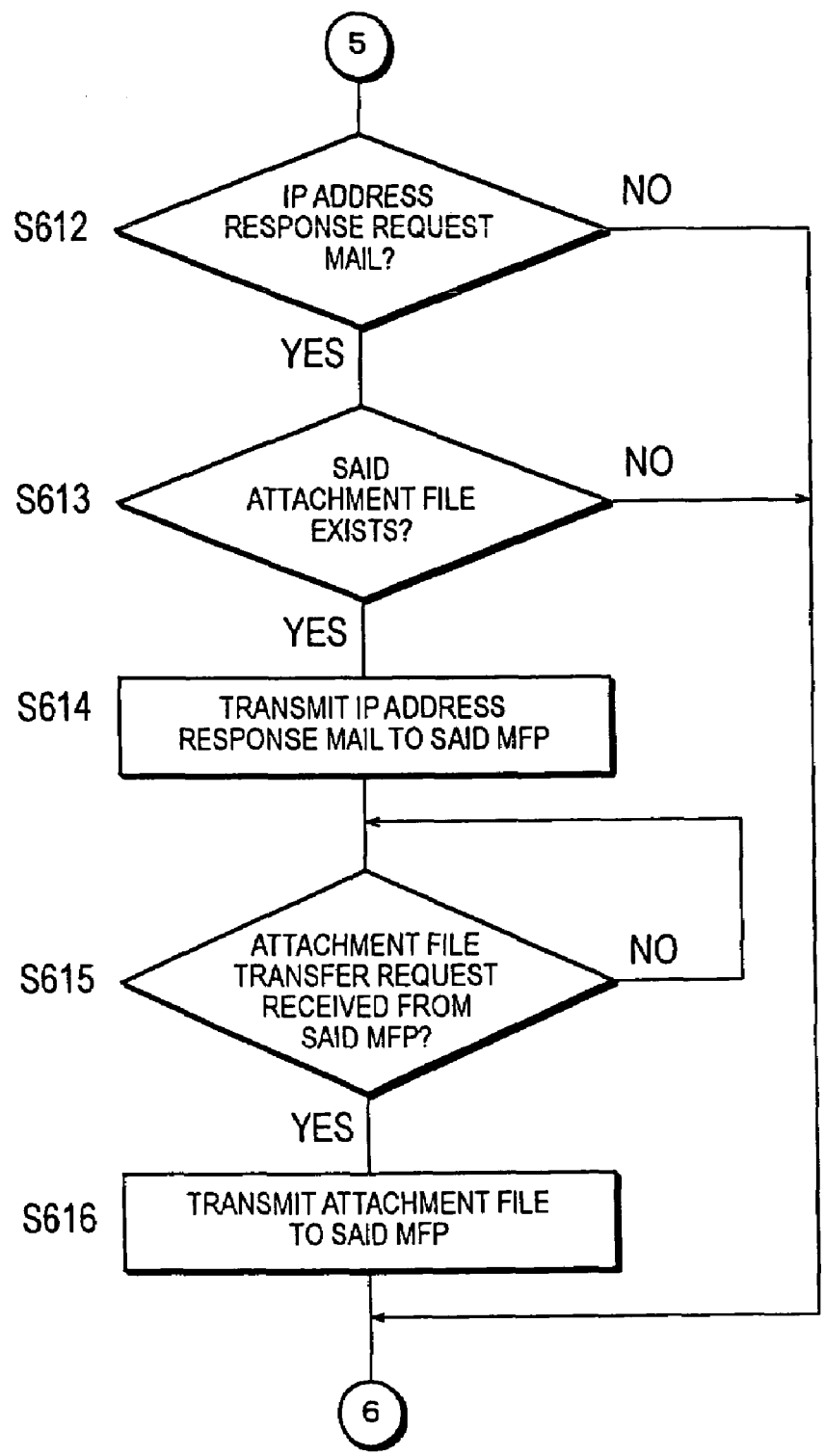

Next, the procedures of image forming process by the MFP at the e-mail transmission destination will be described below in detail. FIGS. 14-16 are a flowchart showing the image forming process of MFP 11b according to this embodiment. The procedures of the image forming processes for MFP 12b, 13b and 14b are similar to this. In FIGS. 14-16, when e-mail is received (S601: Yes), if the received e-mail is e-mail concerning e-mail printing and it contains an attachment file removal notice (S602: Yes and S603: Yes), MFP 11b transmits IP address response request mail to the transmission source and other transmission destinations of said e-mail (S604). FIG. 17 is an example of IP address response requesting mail transmitted by MFP 11b to the transmission source and other transmission destinations according to this embodiment. In FIG. 17, IP address response request mail 44 has the mail addresses of MFP 14b, which is the transmission source of the e-mail, as well as MFP 12b and 13b, which are the other transmission destinations of the e-mail, setup as the transmission destinations. Moreover, the body of IP address response request mail 44 includes the IP address response request asking to respond the IP address so that the removed attachment file "scan #001.jpg" can be downloaded.

In FIGS. 14-16, after transmitting the IP address response request mail, MFP 11b waits until response e-mail is received (S601: No); upon receiving IP address response mail from the transmission source or another transmission destination containing the IP address of the corresponding MFP (S601: yes; S602: No; and S605: yes), it extracts the IP address of the corresponding MFP from the received IP address response mail (S606). FIG. 18 shows an example of IP address response mail responded by MFP 12b to MFP 11b according to this embodiment. In FIG. 18, the body of IP address response mail 45 contains the IP address of MFP 12b, "111.222.333.555."

Next, in FIGS. 14-16, if MFP 11b can access to the MFP corresponding to the extracted IP address (S607: Yes), MFP 11b transmits an attachment file transfer request to said MFP corresponding to the extracted IP address via network interface 108 and network 31 (S608). MFP 11b waits until it receives the attachment file from said MFP corresponding to the extracted IP address (S609: No), stores the attachment file to the hard disk when it receives the attachment file from said MFP corresponding to the extracted IP address via network 31 and network interface 108 (S609: yes), develops the attachment file to bitmap data (S610), and prints it out by means of printing unit 107 (S611).

Incidentally, the system can also be constituted in such a way that said MFP corresponding to the extracted IP address has to go through an access certification procedure when MFP 11b accesses said MFP in order to receive the attachment file, in which case the IP address response request mail which MFP 11b transmits to the transmission source and other transmission destinations contains a response request for information such as ID and password that are required for said certification procedure, and MFP 11b goes through said certification using the information such as ID and password that are contained in the IP address response mail received from said MFP corresponding to the extracted IP address.

On the other hand, if the e-mail received in step S601 is an IP address response request mail from another MFP (e.g., MFP 12b, 13b, 14b) (S601: yes; S602: No; S605: No; and S612: Yes), a search for said attachment file is made in hard disk 104, and if said attachment file exists (S613: Yes), IP address response mail containing its own IP address is returned to said another MFP (S614). It then waits for a transfer request for the attachment file to arrive from said another MFP (S615: No), and, upon receiving the attachment file transfer request from said another MFP via network 31 and network interface 108 (S615: Yes), it then transmits the attachment file to said another MFP via network interface 108 and network 31 (S616).

Figure 19:
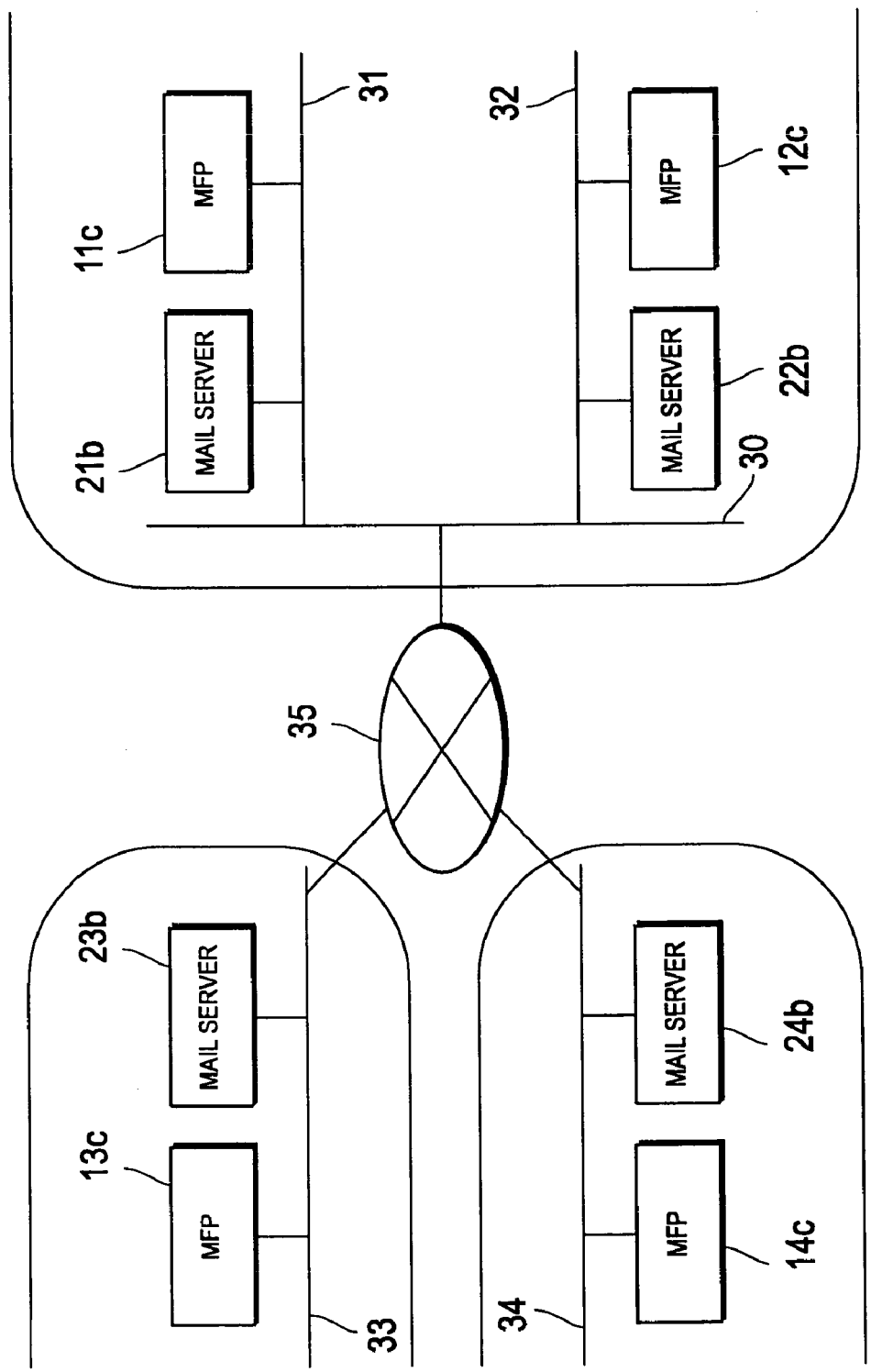
FIG. 19 is a block diagram showing the entire constitution of an image processing system including an image processing device according to a third embodiment of the present invention.

FIG. 19 is a block diagram showing the entire constitution of an image processing system including an image processing device according to a third embodiment of the present invention. The image processing system according to this embodiment is equipped with MFP 11c, 12c, 13c and 14c as the image processing device as well as mail servers 21b, 22b, 23b and 24b, and all of them are interconnected so that they can communicate with each other via network 30, 31, 32, 33, 34 and 35 similar to the first embodiment described above. The constitutions and functions of MFP 11c, 12c, 13c and 14c are similar to those of MFP 11a, 12a, 13a and 14a in the first embodiment, and the constitutions and functions of mail servers 21b, 22b, 23b and 24b are similar to those of mail servers 21a, 22a, 23a and 24a of the first embodiment. However, mail servers 21b, 22b, 23b and 24b do not have the functions of removing attachment files of e-mail that exceed the capacity limits, while they have the functions of refusing to deliver said e-mail, if the received e-mail exceeds the preset capacity limits, and issuing e-mail to the transmission source notifying of the situation. The constitutions and functions of network 30, 31, 32, 33, 34 and 35 are similar to those described for the first embodiment.

Figure 20:
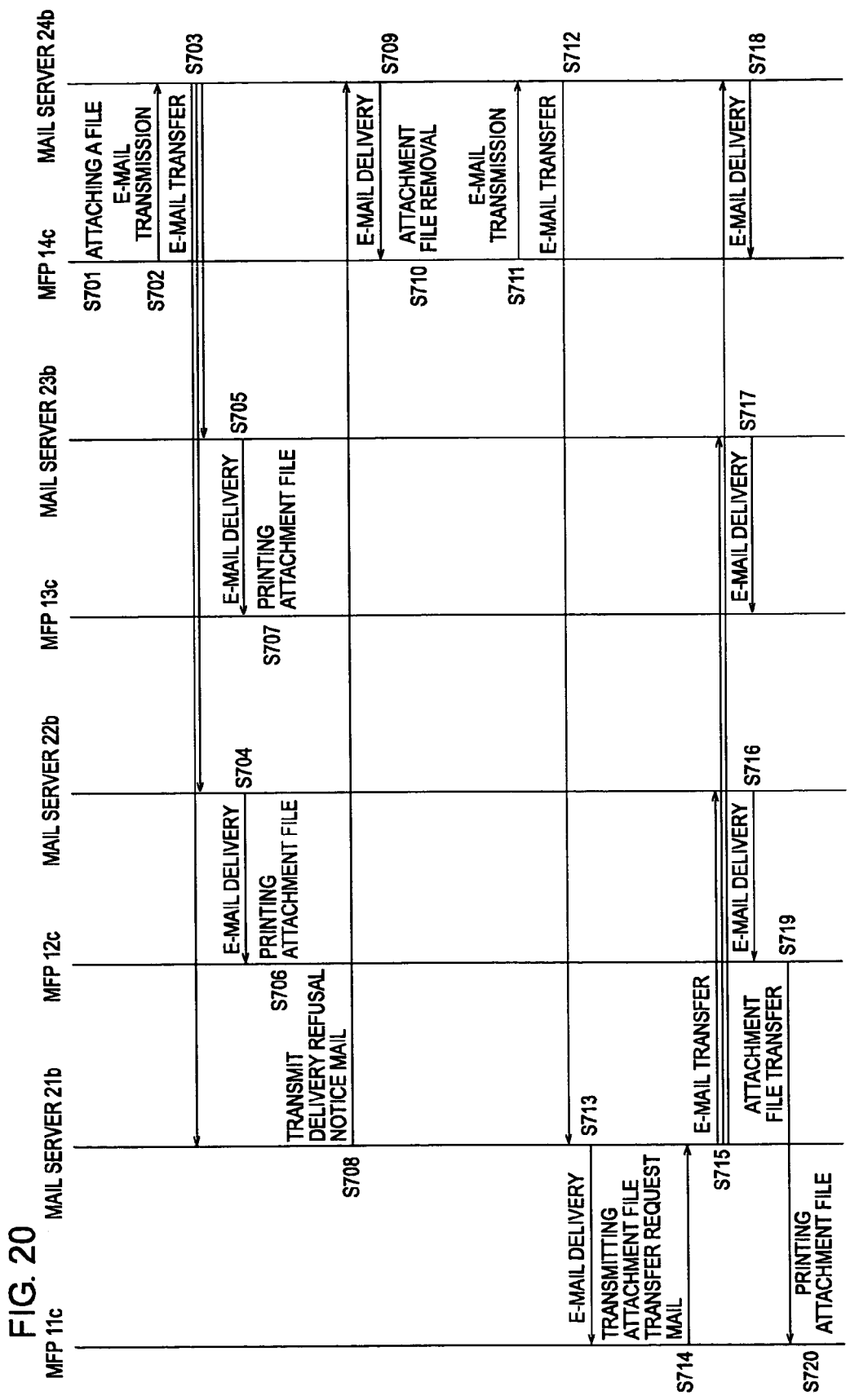
FIG. 20 is a sequence chart showing the image processing procedure of the image processing system according to this embodiment.

Next, the outline of the image processing system according to this embodiment will be described below. FIG. 20 is a sequence chart showing the image processing procedure of the image processing system according to this embodiment. In FIG. 20, MFP 14c transmits e-mail attached with image data, which is acquired by scanning the document, to MFP 11c, 12c and 13c in a similar manner as in the image processing system according to the first embodiment; upon receiving the e-mail, mail servers 22b and 23b deliver it to MFP 12c and 13c; and MFP 12c and 13c prints the attachment file of the e-mail received (S701-S707).

On the other hand, since the received e-mail exceeds the capacity limit, mail server 21b refuses to deliver it to MFP 11c, and issues e-mail containing the notice that the e-mail's delivery is refused due to the capacity limitation (delivery refusal notice mail) addressed to MFP 14c, the transmission source (S708), which is then delivered to MFP 14c by mail server 24b in turn (S709). Upon receiving the delivery refusal notice mail, MFP 14c deletes the attachment file from the original e-mal (S710), and retransmits thee-mail deprived of the attachment file to MFP 11c (S711). Mail server 24b then transfers it to mail server 21b (S712), and mail server 21b delivers it to MFP 11c (S713).

Upon receiving the e-mail deprived of the attachment file, MFP 11c transmits attachment file transfer request mail to MFP 12c, 13c and 14c, receives as a result the attachment file from MFP 12c, and prints it out in a similar manner as in the operation of MFP 11*a* of the image processing system of the first embodiment (S714-S720).

Figure 21:
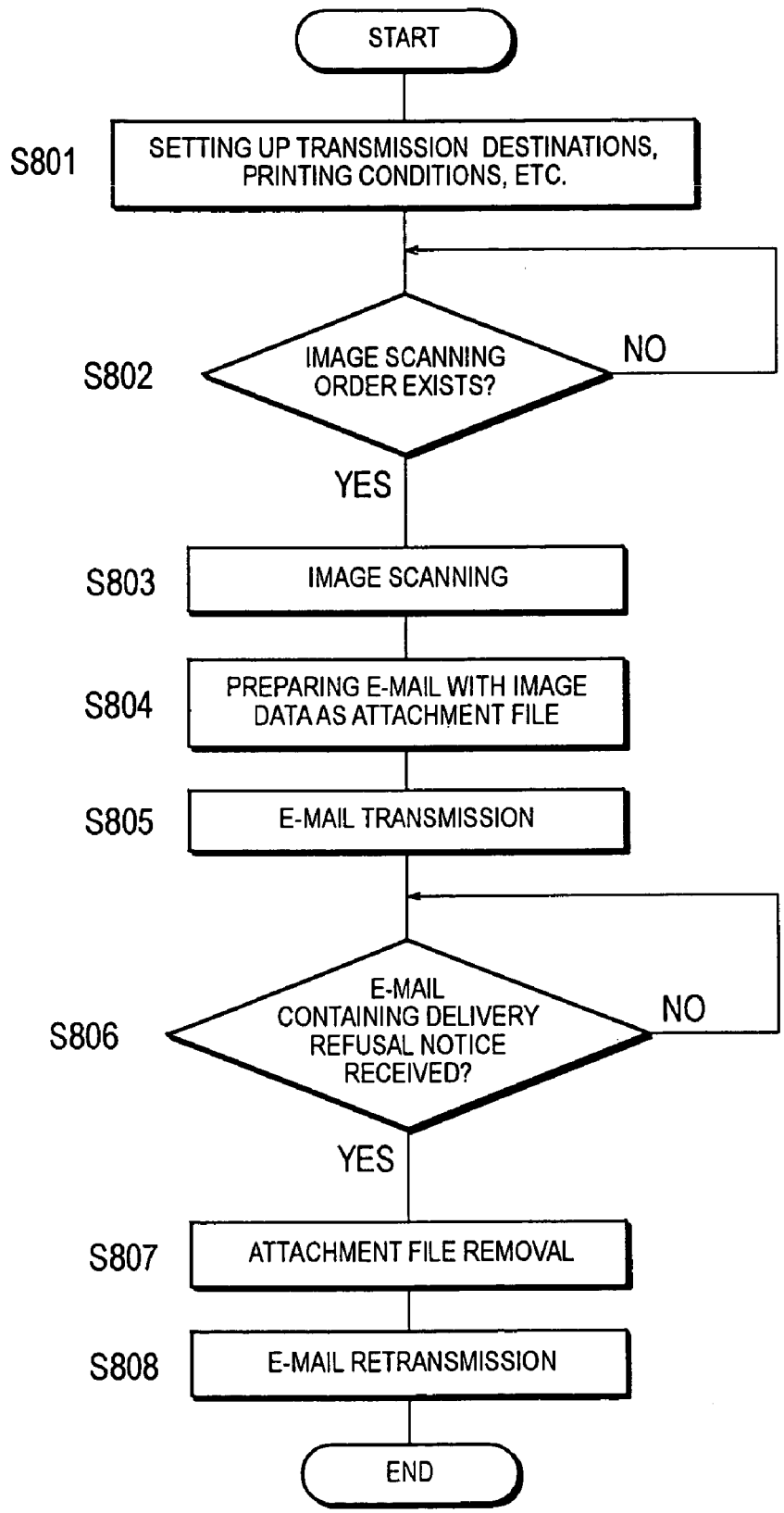
FIG. 21 is a flowchart for describing the procedure of the e-mail transmitting process of MFP 14c according to this embodiment.

Next, the procedures of e-mail transmission process by the MFP at the e-mail transmission source will be described below in detail. FIG. 21 is a flowchart for describing the procedure of the electronic mail transmitting process of MFP 14*c* according to this embodiment. In FIG. 21, MFP 14*c* acquires the image data by scanning the document image, prepares e-mail attached with a file containing said image data, and transmits the e-mail to mail server 24*b* via network interface 108 and network 34 in a similar manner as in the e-mail process transmission process for MFP 14*a* in the first embodiment (S801-S805). If delivery refusal notice mail is received from the mail server pertaining to the transmission destination (S806: Yes), the attachment file is removed from the original e-mail (S807), attachment file removal notice is added to said e-mail as in e-mail 42 (FIG. 8) of the aforementioned first embodiment (S808), and retransmitted to said mail server (S809).

Although it was assumed in the aforementioned embodiments that the image processing device according to the present invention is an MFP having scanning, printing, copying and e-mail printing functions, the image processing device according to the present invention is not limited thereto. Other modes of the image processing device according to this invention include scanners, printers, digital copying machines, facsimile machines, e-mail printers and the like, either as a standalone unit or an MFP having a combination of their functions.

The image processing device and the method of image processing, as well as mail servers and mail delivery method, according to this invention can be realized by a dedicated hardware circuit for executing the abovementioned steps, or by causing a CPU to execute a program where said steps are described. If the present invention is to be materialized by the latter means, the specified programs for operating the image processing device and the like can be provided by computer-readable recording media such as a floppy® disk and CD-ROM, or can be provided on-line via a network such as the Internet. In this case, the program recorded on the computer readable recording medium is normally transferred to and stored in a memory device such as ROM and a hard disk. The program can also be provided as independent application software or can be built into the software of the image processing device as a part of its function.

As mentioned above, an image processing device according to the present invention is capable of acquiring and printing out an attachment file by asking the transmission source or another transmission destination, which has received the file, to transmit it, even when the attachment file cannot be delivered with the original e-mail due to a mail server's capacity limit.

Also, an image processing device according to the present invention is capable of acquiring and printing out an attachment file by accessing the transmission source or another transmission destination, which has received the file, to download, even when the attachment file cannot be delivered with the original e-mail due to a mail server's capacity limit.

What is claimed is:

1. An image processing device comprising:
   an e-mail receiving means for receiving a first e-mail transmitted with an attachment file but deprived of said attachment file due to a capacity limit of a relaying mail server;
   an e-mail transmitting means for transmitting a second e-mail, which contains information of an online location and a transfer request for transferring said attachment file, to a transmission source of said first e-mail and other transmission destinations of said first e-mail in response to receiving of said first e-mail;
   an attachment file receiving means for receiving said attachment file transmitted in response to said second e-mail from equipment pertaining to the transmission source or another transmission destination of said first e-mail; and
   an image forming means for forming images of said attachment file in response to receiving of said attachment file.

2. An image processing device comprising:
   a first e-mail receiving means for receiving a first e-mail having an attachment file;
   an image forming means for forming images of said attachment file;
   a second e-mail receiving means for receiving a second e-mail, which contains online location information of equipment pertaining to another transmission destination of said first e-mail and a transfer request for transferring said attachment file, from said another transmission destination; and
   an attachment file transferring means for transferring said attachment file to equipment pertaining to said another transmission destination in response to receiving of said second e-mail, when it is possible to access said equipment pertaining to said another transmission destination based on the online location information of said equipment pertaining to said another transmission destination.

3. An image processing device comprising:
   an e-mail transmitting means for transmitting a first e-mail having an attachment file;
   an e-mail receiving means for receiving a second e-mail containing online location information of equipment pertaining to a transmission destination of said first e-mail and a transfer request for transferring said attachment file, from said transmission destination; and
   an attachment file transferring means for transferring said attachment file to said equipment pertaining to said transmission destination in response to receiving of said second e-mail, when it is possible to access said equipment pertaining to said transmission destination based on the online location information of said equipment pertaining to said transmission destination.

4. An image processing device described in claim 3, further comprising:
   an e-mail retransmitting means for retransmitting said first e-mail deprived of said attachment file to said transmission destination of said first e-mail, when said first e-mail cannot be delivered to said transmission destination due to a relaying mail server's capacity limitation.

5. An image processing device described in claim 3, further comprising:
   an image reading device for acquiring image data by reading an image;
   wherein said attachment file is the image data acquired by said image reading device.

6. An image processing device comprising:
   a first e-mail receiving means for receiving a first e-mail transmitted with an attachment file but deprived of said attachment file due to a capacity limit of a relaying mail server;
   an e-mail transmitting means for transmitting a second e-mail containing a response request for responding with online location information of equipment pertaining to a transmission source of said first e-mail or other transmission destinations of said first e-mail to said transmission source and said other transmission destinations in response to receiving of said first e-mail;

a second e-mail receiving means for receiving a third e-mail, which contains online location information of equipment pertaining to said transmission source or another transmission destination of said first e-mail, transmitted from said transmission source or said another transmission destination in accordance with said second e-mail;

a transfer request transmitting means for transmitting a transfer request for transferring said attachment file to equipment pertaining to said transmission source or said another transmission destination in response to receiving of said third e-mail, when it is possible to access to said equipment pertaining to said transmission source or said another transmission destination based on the online location information of equipment pertaining to said transmission source or said another transmission destination;

an attachment file receiving means for receiving said attachment file transmitted from said transmission source or said another transmission destination in response to said transfer request; and an image forming means for forming images of said attachment file in response to the receiving of said attachment file by said attachment file receiving means.

7. An image processing device comprising:

a first e-mail receiving means for receiving a first e-mail having an attachment file;

an image forming means for forming images of said attachment file;

a second e-mail receiving means for receiving a second e-mail containing a response request for responding with online location information, from another transmission destination of said first e-mail;

an e-mail transmission means for transmitting a third e-mail containing the online location information to said another transmission destination in response to receiving of said second e-mail;

a transfer request receiving means for receiving a transfer request for transferring said attachment file transmitted in response to said third e-mail by equipment pertaining to said another transmission destination; and an attachment file transfer means for transmitting said attachment file to equipment pertaining to said another transmission destination in response to said transfer request.

8. An image processing device comprising:

a first e-mail transmitting means for transmitting a first e-mail having an attached file;

an e-mail receiving means for receiving a second e-mail containing a response request for responding with online location information, from a transmission destination of said first e-mail;

a second e-mail transmission means for transmitting a third e-mail containing the online location information to said transmission destination in response to receiving of said second e-mail;

a transfer request receiving means for receiving a transfer request for transferring said attachment file, said transfer request being transmitted from equipment pertaining to said transmission destination in response to said third e-mail; and an attachment file transfer means for transmitting said attachment file to equipment pertaining to said transmission destination in response to said transfer request.

9. An image processing device described in claim 8, further comprising:

an e-mail retransmitting means for retransmitting said first e-mail deprived of said attachment file to said transmission destination of said first e-mail, when said first e-mail cannot be delivered to said transmission destination due to a relaying mail server's capacity limitation.

10. An image processing device described in claim 8, further comprising:

an image reading device for acquiring image data by reading an image;

wherein said attachment file is the image data acquired by said image reading device.

11. An image processing device comprising:

an e-mail receiving part for receiving a first e-mail transmitted with an attachment file but deprived of said attachment file due to a capacity limit of a relaying mail server;

an e-mail transmitting part for transmitting a second e-mail, which contains information of an online location and a transfer request for transferring said attachment file, to a transmission source of said first e-mail and other transmission destinations of said first e-mail in response to receiving of said first e-mail;

an attachment file receiving part for receiving said attachment file transmitted in response to said second e-mail from equipment pertaining to the transmission source or another transmission destination of said first e-mail; and an image forming part for forming images of said attachment file in response to the receiving of said attachment file by said attachment file receiving part.

12. An image processing device comprising:

a first e-mail receiving part for receiving a first e-mail having an attachment file;

an image forming part for forming images of said attachment file;

a second e-mail receiving part for receiving a second e-mail, which contains online location information of equipment pertaining to another transmission destination of said first e-mail and a transfer request for transferring said attachment file, from said another transmission destination; and an attachment file transferring part for transferring said attachment file to equipment pertaining to said another transmission destination in response to receiving of said second e-mail, when it is possible to access said equipment pertaining to said another transmission destination based on the online location information of said equipment pertaining to said another transmission destination.

13. An image processing device comprising:

an e-mail transmitting part for transmitting a first e-mail having an attachment file;

an e-mail receiving part for receiving a second e-mail containing online location information of equipment pertaining to a transmission destination of said first e-mail and a transfer request for transferring said attachment file, from said transmission destination; and an attachment file transferring part for transferring said attachment file to said equipment pertaining to said transmission destination in response to receiving of said second e-mail, when it is possible to access said equipment pertaining to said transmission destination based on the online location information of said equipment pertaining to said transmission destination.

14. An image processing device comprising:
a first e-mail receiving part for receiving a first e-mail transmitted with an attachment file but deprived of said attachment file due to a capacity limit of a relaying mail server;
an e-mail transmitting part for transmitting a second e-mail containing a response request for responding with online location information of equipment pertaining to a transmission source of said first e-mail or other transmission destinations of said first e-mail to said transmission source and said other transmission destinations in response to receiving of said first e-mail;
a second e-mail receiving part for receiving a third e-mail, which contains online location information of equipment pertaining to said transmission source or another transmission destination of said first e-mail, transmitted from said transmission source or said another transmission destination in accordance with said second e-mail;
a transfer request transmitting part for transmitting a transfer request for transferring said attachment file to equipment pertaining to said transmission source or said another transmission destination in response to receiving of said third e-mail, when it is possible to access to said equipment pertaining to said transmission source or said another transmission destination based on the online location information of equipment pertaining to said transmission source or said another transmission destination;
an attachment file receiving part for receiving said attachment file transmitted from said transmission source or said another transmission destination in response to said transfer request; and
an image forming part for forming images of said attachment file in response to the receiving of said attachment file by said attachment file receiving part.

15. An image processing device comprising:
a first e-mail receiving part for receiving a first e-mail having an attachment file;
an image forming part for forming images of said attachment file;
a second e-mail receiving part for receiving a second e-mail containing a response request for responding with online location information, from another transmission destination of said first e-mail;
an e-mail transmission part for transmitting a third e-mail containing the online location information to said another transmission destination in response to receiving of said second e-mail;
a transfer request receiving part for receiving a transfer request for transferring said attachment file, said transfer request being transmitted in response to said third e-mail by equipment pertaining to said another transmission destination; and
an attachment file transfer part for transmitting said attachment file to equipment pertaining to said another transmission destination in response to said transfer request.

16. An image processing device comprising:
a first e-mail transmitting part for transmitting a first e-mail having an attached file;
an e-mail receiving part for receiving a second e-mail containing a response request for responding with online location information, from a transmission destination of said first e-mail;
a second e-mail transmission part for transmitting a third e-mail containing the online location information to said transmission destination in response to receiving of said second e-mail;
a transfer request receiving part for receiving a transfer request for transferring said attachment file, said transfer request being transmitted from equipment pertaining to said transmission destination in response to said third e-mail; and
an attachment file transfer part for transmitting said attachment file to equipment pertaining to said transmission destination in response to said transfer request.

17. An image processing method comprising:
a step of receiving a first e-mail transmitted with an attachment file but deprived of said attachment file due to a capacity limit of a relaying mail server;
a step of transmitting a second e-mail, which contains information of an online location and a transfer request for transferring said attachment file, to a transmission source of said first e-mail and other transmission destinations of said first e-mail in response to receiving of said first e-mail;
a step of receiving said attachment file transmitted in response to said second e-mail from equipment pertaining to the transmission source or another transmission destination of said first e-mail; and
a step of forming images of said attachment file in response to receiving of said attachment file.

18. An image processing method comprising:
a step of receiving a first e-mail having an attachment file;
a step of forming images of said attachment file;
a step of receiving a second e-mail, which contains online location information of equipment pertaining to another transmission destination of said first e-mail and a transfer request for transferring said attachment file, from said another transmission destination; and
a step of transferring said attachment file to equipment pertaining to said another transmission destination in response to receiving of said second e-mail, when it is possible to access said equipment pertaining to said another transmission destination based on the online location information of said equipment pertaining to said another transmission destination.

19. An image processing method comprising:
a step of transmitting a first e-mail having an attachment file;
a step of receiving a second e-mail containing an online location information of equipment pertaining to a transmission destination of said first e-mail and a transfer request for transferring said attachment file, from said transmission destination; and
a step of transferring said attachment file to said equipment pertaining to said transmission destination in response to receiving of said second e-mail, when it is possible to access said equipment pertaining to said transmission destination based on the online location information of said equipment pertaining to said transmission destination.

20. An image processing method comprising:
a step of receiving a first e-mail transmitted with an attachment file but deprived of said attachment file due to a capacity limit of a relaying mail server;
a step of transmitting a second e-mail containing a response request for responding with online location information of equipment pertaining to a transmission source of said first e-mail or other transmission destinations of said first e-mail to said transmission source and said other transmission destinations in response to receiving of said first e-mail;
a step of receiving a third e-mail, which contains online location information of equipment pertaining to said transmission source or another transmission destination of said first e-mail, transmitted from said transmission source or said another transmission destination in accordance with said second e-mail;

a step of transmitting a transfer request for transferring said attachment file to equipment pertaining to said transmission source or said another transmission destination in response to receiving of said third e-mail, when it is possible to access to said equipment pertaining to said transmission source or said another transmission destination based on the online location information of equipment pertaining to said transmission source or said another transmission destination;

a step of receiving said attachment file transmitted from said transmission source or said another transmission destination in response to said transfer request; and a step of forming images of said attachment file in response to receiving of said attachment file.

21. An image processing method comprising:

a step of receiving a first e-mail having an attachment file;

a step of forming images of said attachment file;

a step of receiving a second e-mail containing a response request for responding with online location information, from another transmission destination of said first e-mail;

a step of transmitting a third e-mail containing the online location information to said another transmission destination in response to receiving of said second e-mail;

a step of receiving a transfer request for transferring said attachment file transmitted in response to said third e-mail by equipment pertaining to said another transmission destination; and a step of transmitting said attachment file to equipment pertaining to said another transmission destination in response to said transfer request.

22. An image processing method comprising:

a step of transmitting a first e-mail having an attached file;

a step of receiving a second e-mail containing a response request for responding with online location information, from a transmission destination of said first e-mail;

a step of transmitting a third e-mail containing the online location information to said transmission destination in response to receiving of said second e-mail;

step of receiving a transfer request for transferring said attachment file, said transfer request being transmitted from equipment pertaining to said transmission destination in response to said third e-mail; and a step of transmitting said attachment file to equipment pertaining to said transmission destination in response to said transfer request.

23. A computer-readable medium having an image processing program stored thereon for causing an image processing device to execute:

a step of receiving a first e-mail transmitted with an attachment file but deprived of said attachment file due to a capacity limit of a relaying mail server;

a step of transmitting a second e-mail, which contains information of an online location and a transfer request for transferring said attachment file, to a transmission source of said first e-mail and other transmission destinations of said first e-mail in response to receiving of said first e-mail;

a step of receiving said attachment file transmitted in response to said second e-mail from equipment pertaining to the transmission source or another transmission destination of said first e-mail; and a step of forming images of said attachment file in response to receiving of said attachment file.

24. A computer-readable medium having an image processing program stored thereon for causing an image processing device to execute:

a step of receiving a first e-mail having an attachment file;

a step of forming images of said attachment file;

a step of receiving a second e-mail, which contains online location information of equipment pertaining to another transmission destination of said first e-mail and a transfer request for transferring said attachment file, from said another transmission destination; and a step of transferring said attachment file to equipment pertaining to said another transmission destination in response to receiving of said second e-mail, when it is possible to access said equipment pertaining to said another transmission destination based on the online location information of said equipment pertaining to said another transmission destination.

25. A computer-readable medium having an image processing program stored thereon for causing an image processing device to execute:

a step of transmitting a first e-mail having an attachment file;

a step of receiving a second e-mail containing online location information of equipment pertaining to a transmission destination of said first e-mail and a transfer request for transferring said attachment file, from said transmission destination; and a step of transferring said attachment file to said equipment pertaining to said transmission destination in response to receiving of said second e-mail, when it is possible to access said equipment pertaining to said transmission destination based on the online location information of said equipment pertaining to said transmission destination.

26. A computer-readable medium having an image processing program stored thereon as described in claim 25 for further causing an image processing device to execute:

a step of retransmitting said first e-mail deprived of said attachment file to said transmission destination of said first e-mail, when said first e-mail cannot be delivered to said transmission destination due to a relaying mail server's capacity limitation.

27. A computer-readable medium having an image processing program stored thereon as described in claim 25 for further causing an image processing device to execute:

an image reading step of acquiring image data by reading an image; wherein said attachment file is the image data acquired by said image reading step.

28. A computer-readable medium having an image processing program stored thereon for causing an image processing device to execute:

a step of receiving a first e-mail transmitted with an attachment file but deprived of said attachment file due to a capacity limit of a relaying mail server;

a step of transmitting a second e-mail containing a response request for responding with online location information of equipment pertaining to a transmission source of said first e-mail or other transmission destinations of said first e-mail to said transmission source and said other transmission destinations in response to receiving of said first e-mail;

a step of receiving a third e-mail, which contains online location information of equipment pertaining to said transmission source or another transmission destination of said first e-mail, transmitted from said transmission source or said another transmission destination in accordance with said second e-mail;

a step of transmitting a transfer request for transferring said attachment file to equipment pertaining to said transmission source or said another transmission destination in response to receiving of said third e-mail, when it is possible to access to said equipment pertaining to said transmission source or said another transmission destination based on the online location information of equipment pertaining to said transmission source or said another transmission destination;

a step of receiving said attachment file transmitted from said transmission source or said another transmission destination in response to said transfer request; and a step of forming images of said attachment file in response to receiving of said attachment file.

29. A computer-readable medium having an image processing program stored thereon for causing an image processing device to execute:

a step of receiving a first e-mail having an attachment file;

a step of forming images of said attachment file;

a step of receiving a second e-mail containing a response request for responding with online location information, from another transmission destination of said first e-mail;

a step of transmitting a third e-mail containing the online location information to said another transmission destination in response to receiving of said second e-mail;

a step of receiving a transfer request for transferring said attachment file, said transfer request being transmitted in response to said third e-mail by equipment pertaining to said another transmission destination; and a step of transmitting said attachment file to equipment pertaining to said another transmission destination in response to said transfer request.

30. A computer-readable medium having an image processing program stored thereon for causing an image processing device to execute:

a step of transmitting a first e-mail having an attached file;

a step of receiving a second e-mail containing a response request for responding with online location information, from a transmission destination of said first e-mail;

a step of transmitting a third e-mail containing the online location information to said transmission destination in response to receiving of said second e-mail;

a step of receiving a transfer request for transferring said attachment file, said transfer request being transmitted from equipment pertaining to said transmission destination in response to said third e-mail; and a step of transmitting said attachment file to equipment pertaining to said transmission destination in response to said transfer request.

31. A computer-readable medium having an image processing program stored thereon as described in claim 30 for further causing an image processing device to execute:

a step of retransmitting said first e-mail deprived of said attachment file to said transmission destination of said first e-mail, when said first e-mail cannot be delivered to said transmission destination due to a relaying mail server's capacity limitation.

32. A computer-readable medium having an image processing program stored thereon as described in claim 30 for further causing an image processing device to execute:

an image reading step of acquiring image data by reading an image;

wherein said attachment file is the image data acquired by said image reading step.

* * * * *